(12) United States Patent
Bryham

(10) Patent No.: US 7,004,801 B2
(45) Date of Patent: Feb. 28, 2006

(54) AMPHIBIOUS VEHICLE

(75) Inventor: Maurice John Bryham, Milford (NZ)

(73) Assignee: Sealegs International Limited, Auckland (NZ)

(*) Notice: Subject to any disclaimer, the term of this patent is extended or adjusted under 35 U.S.C. 154(b) by 0 days.

(21) Appl. No.: 10/493,624

(22) PCT Filed: Dec. 17, 2002

(86) PCT No.: PCT/NZ02/00277

§ 371 (c)(1),
(2), (4) Date: Apr. 23, 2004

(87) PCT Pub. No.: WO03/051712

PCT Pub. Date: Jun. 26, 2003

(65) Prior Publication Data
US 2005/0020149 A1   Jan. 27, 2005

(30) Foreign Application Priority Data

Dec. 17, 2001 (NZ) .................. 516154
Apr. 29, 2002 (NZ) .................. 518603
Jul. 12, 2002 (NZ) .................. 520154
Jul. 19, 2002 (NZ) .................. 520297
Jul. 23, 2002 (NZ) .................. 520334

(51) Int. Cl.
*B60F 3/00* (2006.01)

(52) U.S. Cl. .......... 440/12.54; 114/344; 114/345; 441/12.5; 441/12.52

(58) Field of Classification Search ........ 114/344, 114/345; 440/12.5, 12.51, 12.52, 12.53, 440/12.54
See application file for complete search history.

(56) References Cited

U.S. PATENT DOCUMENTS 3,158,881 A * 12/1964 Clausen .............. 114/344

(Continued)

FOREIGN PATENT DOCUMENTS

CA   2273069   11/1999

(Continued)

*Primary Examiner*—Sherman Basinger

(74) *Attorney, Agent, or Firm*—Young & Thompson

(57) ABSTRACT

An amphibious vehicle (1), in the form of an inflatable boat (2) has a self propelled and steerable retractable undercarriage system, enabling the vehicle to enter and exit the water under its own power. The swing of the wheels and their supporting struts (3) & (4) occurs external to the hull of the vehicle. A steerable nose leg (3) is raised or lowered by an actuator situated inside the boat. Stowage is accomplished within the lines of an inflatable craft by the incorporation of fibreglass fairings (5) & (6) sized to match the main inflated tubes (7). Power is provided to the back wheels (4) via an internal drive train within the legs (4). All terrain balloon type tyres are used to enable the boat to travel over a variety shoreline terrain. A steering system engages with the fornt wheel when the wheel is in its extended position. Motive power is provided by a separate aircooled motor.

14 Claims, 15 Drawing Sheets

Figure 1:
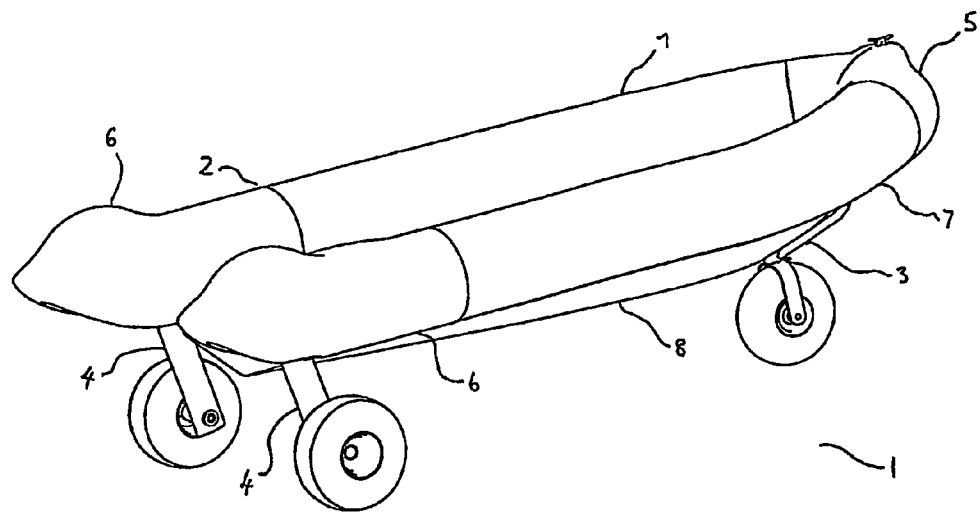

U.S. PATENT DOCUMENTS 3,689,950 A * 9/1972 Jalowiecki et al. ......... 114/344
3,755,838 A * 9/1973 Dunagan ..................... 114/344
4,008,679 A * 2/1977 Bozzano ..................... 114/344
5,176,098 A * 1/1993 Royle ......................... 114/344
5,632,221 A    5/1997 Trenne et al.
5,769,021 A * 6/1998 Schad ....................... 440/12.5

FOREIGN PATENT DOCUMENTS

| | | | |
|---|---|---|---|
| DE | 28 22 182 | 11/1979 | |
| FR | 2 351 856 | * 12/1977 | |
| FR | 2 563 180 | 10/1985 | |
| FR | 2 677 901 | 12/1992 | |
| FR | 2 776 964 | 10/1999 | |
| GB | 2 170 759 | 8/1986 | |
| WO | WO 91/09769 | * 7/1991 | |

* cited by examiner

AMPHIBIOUS VEHICLE

FIELD OF THE INVENTION

This invention relates to amphibious vehicles and retractable, steerable and motorised wheel and leg assemblies for amphibious vehicles.

BACKGROUND OF THE INVENTION

Users of small to medium sized boats will most likely have encountered the problems associated with launching a boat, or retrieving it after use. Whether the boat is to be beached for one hour to enjoy a picnic on a remote beach, or to be removed from the water for winter storage, the difficulties are similar.

Beaching a boat or jet-ski can present a number of problems. The first is that when there is no jetty or wharf in the area in which the boat is to be landed, then at least one of the occupants of the boat usually needs to get their feet wet. This can be both inconvenient and a discomfort, and can pose further difficulties if the boat only has one occupant.

Quite apart from the problems of approaching a beach or shoreline that does not have a jetty or wharf, there is the basic problem of launching and retrieving boats on pieces of shoreline which do not have a suitable launching ramp.

Even if launching ramps are available, recreational boat users still encounter a number of problems, particularly in urban areas because launching ramp facilities are usually in high demand. These areas are often congested since launching ramps usually only have facilities to allow one or two boats to be launched or retrieved at any one time. Therefore at the beginning and end of weekends or other holidays there may be queues at launching ramp facilities since there is often a significant period of time involved in having a motor vehicle with a trailer manoeuvre onto the launching ramp to launch or retrieve the boat.

Another inconvenience with launching and retrieving boats is having to leave the boat in an area adjacent to the ramp while the user goes to retrieve the automobile and trailer and position the automobile and trailer on the ramp. A user then needs to try and retrieve the boat and then facilitate retrieval of the boat onto the trailer. The same occurs when the boat is being launched, only firstly the user launches the boat from the trailer, then the user needs to place the boat at some near location before leaving the boat to park the vehicle and trailer. In these instances where the boat is left at a location adjacent to the ramp the boat is often in the way of other users of the ramp, and there is a risk of the boat drifting from its desired location, causing injury to people, the boat or adjacent property, or even being lost completely.

Where no launching ramp is available, it is often necessary to manoeuvre a towing vehicle and trailer over unpaved terrain and into the water, which in the case of the sea is often highly corrosive to the vehicle and trailer. The terrain may also be difficult to negotiate, for a vehicle and trailer which has been designed for use on paved roads.

At times when a boat is not in use, it is often advantageous to remove it from the water, to protect it from tidal influences, and from the effects of storms which can severely disturb the surface of bodies of water. This usually involves the use of additional vehicles or machinery, which can be inconvenient. Where the shoreline comprises mud flats, or soft sand, specialised tractors may be required.

In past there have been numerous versions of amphibious vehicles designed. Primarlily however these have been land based vehicles with certain modifications to enable them to negotiate short stretches of water, and usually at relatively low speeds. A smaller number of designs have put retractable wheels onto vehicles used primarily as boats. Typically non motorised wheels have been put on smaller boats and dinghies. The boats having retractable wheels do not appear to have had a significant impact on the market, because they either do not perform particularly well on the terrain found on most shorelines, or the modifications to the boats significantly impair their utility or appearance as a boat. Cut-outs and doors or flaps in the hull, as used in these previous designs, often become unsightly, or entangled with seaweed, or leak excessively, or create an undue maintenance burden.

OBJECT OF THE INVENTION

It is an object of the present invention to provide a useful and appealing multi-terrain retractable undercarriage system and/or motorised undercarriage system and/or a steerable undercarriage system, or to provide an amphibious vehicle including a retractable undercarriage system and/or a motorised undercarriage system and/or a steerable undercarriage system, which will at least go some way toward overcoming the foregoing disadvantages, or which will at least provide the public with a useful choice.

SUMMARY OF THE INVENTION

Accordingly in one aspect the invention may broadly be said to consist in an amphibious vehicle having ground engaging means, moveably mounted relative to the amphibious vehicle and capable of being disposed in an extended position in which the amphibious vehicle may be supported by the ground engaging means when they are in contact with terra-firmna, and being capable of being disposed in a retracted position in which the amphibious vehicle may be used on water, wherein the ground engaging means are both deployed and tidily stowed without the need for moveable door or flaps in the surface of the hull of the amphibious vehicle.

Preferably the amphibious vehicle is primarily a waterborne vehicle, for example but not limited to a boat, jet-boat, an inflatable boat, jet-ski, hydrofoil or air boat.

Preferably the ground engaging means consists of at least three wheels.

Preferably the wheels are fitted with rubber tyres.

Preferably the rubber tyres are balloon type rubber tyres.

Preferably the tyres have all-terrain type tread, suited to a range of shoreline terrain.

Optionally the tyres have metal studs suitable to provide traction on icy surfaces.

Optionally one or more of the tyres may be used as a bumper when in the stowed position, to absorb some of the shock experienced when the amphibious vehicle collides with other solid objects.

Optionally the ground engaging means comprise continuous tracks.

As a further option the ground engaging means comprise skids or skis.

As yet a further option the ground engaging means comprise cylinders with helical ridges about their periphery, and aligned substantially along the longitudinal axis of the amphibious vehicle.

Optionally the ground engaging means is a combination of wheels, continuous tracks, skis, or skids.

In a preferred form, the invention further includes a system of retractable undercarriage assemblies for an amphibious vehicle, the assemblies including legs adapted to receive a ground engaging means at one end thereof, and the leg also being adapted to be moveably mounted to an amphibious vehicle.

Preferably at least one of the undercarriage assemblies can be extended in such a way as to give the amphibious vehicle stability when supported and/or travelling on the ground engaging means on a relatively wide range of shoreline terrain.

Optionally at least one of the legs can incorporate shock absorbing features, for example but not limited to a hydraulic or pneumatic damping device.

Preferably at least one of the undercarriage assemblies can be retracted and stowed above the waterline of the amphibious vehicle.

Preferably at least one of the undercarriage assemblies can be stowed substantially within the exterior lines of the amphibious vehicle, and occupy the minimum space within the vehicle.

Preferably at least one of the undercarriage assemblies can be stowed in such a way as to cause minimal hydrodynamic or aerodynamic drag.

Preferably, if the amphibious vehicle is an inflatable craft, at least one of the undercarriage assemblies are stowed substantially within the lines of the primary inflated tubes.

Preferably at least one of the moveable mounted undercarriage assemblies are pivotally attached to the structure of the amphibious vehicle.

Preferably support bearings for the undercarriage assembly pivot attachments are positioned in reinforced structure on the hull of the amphibious vehicle and are positioned distal from the primary axis of the amphibious vehicle. This is of most importance in the case of the forward most undercarriage assembly, which may include a single wheel, and the incorporation of bearing supports as far apart as possible on the typically narrower bow section of the vehicle will provide a more stable attachment means.

Preferably the bow end pivot support assembly comprises at least a shaft passing from port to starboard, above the water line, and supported in reinforced structure in the hull of the amphibious vehicle, at both the port and starboard sides.

Preferably the shaft passing from port to starboard further comprises means to engage with an actuator.

Optionally the shaft passing from port to starboard comprises a shaft assembly made up of more than one shaft.

Preferably the forward leg comprises two rigid elongate members, one end of each pivotally supported from each side of the vehicle, and the other end of each member rigidly connected to each other, to form a substantially "V" shape.

More preferably the two rigid elongate members forming the forward leg are shaped to fit neatly about the bow of the vehicle when the leg is in the stowed position.

Preferably the two rigid elongate members are each rigidly attached to opposing ends of the shaft passing from port to starboard through the hull of the amphibious vehicle Optionally the two rigid elongate members are not attached to a transverse shaft, but simply pivotally attached to the hull, or a fitting thereon.

Optionally the bow support leg comprises a single rigid elongate member pivoted about a point forward of the centre of gravity of the boat, and close to or above the waterline.

Preferably the stern leg pivot supports are mounted adjacent to the aft port and aft starboard corners of the amphibious vehicle, and above the water line.

Preferably each of the aft support legs are "7" shaped, having the free end of one leg of the "7" shape pivotally attached to the structure of the vehicle and the leg being able to pivot in such a way that the other leg of the "7" shape moves downwards from a substantially horizontal inclination in the stowed position, to a substantially vertical inclination in the extended position, substantially without passing through any of the primary structure of the amphibious vehicle.

Optionally each aft support leg comprises at least a substantially straight elongate member, pivoting from the hull of the vehicle, the pivot being adjacent to one end of the leg.

Preferably the legs are of sufficient length to keep any propeller, jet nozzle, or rudder clear of ground contact.

Optionally any of the legs may include a step to assist entry or exit from the amphibious vehicle.

Optionally the moveable mounted undercarriage assemblies are attached to the structure of the amphibious vehicle by slidable means, for example but not limited to straight or curved telescoping shaft assemblies, or legs operating within a series of guide rollers.

Optionally any one or combination of the undercarriage assemblies may be provided with attachment points or attachment features to allow a tow bar or other towing means to be connected, providing a means to tow the amphibious vehicle over land using another vehicle, or harnessed animal, etc.

Preferably at least one of the undercarriages can be mechanically locked in either or both the extended and/or retracted positions.

More preferably the mechanical locks provide firm structural connection between the undercarriage assembly and the hull of the amphibious vehicle, distal to the leg pivot points.

Preferably steerable leg assemblies are mechanically locked or clamped adjacent to the mating point of the steering mechanism, to ensure a stable connection of the steering system is maintained.

Optionally at least one leg assembly, at a location distal from the moveable attachment to the hull structure, also comprises a member shaped to mate with the lower surface of the hull, at the location where the leg contacts the hull, and of sufficient area to spread and transfer loads between the hull and the ground engagement means during land supported operations, without causing damage to the hull structure.

Optionally the hull is formed having at least one recess into which at least one hook, moveably attached to at least one leg assembly, can be engaged to restrain the leg in at least one direction.

Optionally at least one movably attached hook has powered means to move the hook and engage it with a recess in the hull.

Optionally features are provided in the leg assemblies and hull to manually install downlock pins or clamps to further mechanically lock the leg assemblies in the extended or retracted positions if required.

In a preferred form, the invention further includes a system of retractable leg assemblies for an amphibious vehicle, wherein powered mechanisms are employed to either extend or retract the leg assemblies, or both extend and retract the leg assemblies.

Preferably the powered mechanisms can fully extend or retract the leg assemblies when the amphibious vehicle is supported on water.

Preferably the powered mechanisms can fully extend the legs, and lift the vehicle if necessary, even when the amphibious vehicle is situated on dry land.

Preferably the powered mechanisms are in the form of an hydraulic system, comprising for example but not limited to a pump, valves and actuators.

Preferably a hydraulic actuator in the bow of the amphibious vehicle acts via levers to rotate the transverse shaft located between the two rigid elongate members forming the leg of the forward undercarriage assembly, if that configuration of undercarriage is chosen.

Preferably a hydraulic actuator acts directly onto each of the "7" shaped aft support legs, if that configuration of undercarriage is chosen.

Preferably the hydraulic actuators incorporate locking features to mechanically or hydraulically lock the actuator in both or either the extended or retracted positions.

Optionally the powered mechanisms comprise an electrical or pneumatic system.

Optionally an electrical system, comprising at least an electric motor and reduction gearbox forming a rotary actuator, causes at least one leg to move.

Preferably the powered mechanisms can be controlled from a single central location, the cockpit for example.

Alternatively the powered mechanisms incorporate manual powered means, for example but not limited to lever operated mechanisms, hand pump and actuators, crank handle and rotary actuators, or pulleys and ropes or cables.

Optionally some or all of the ground engaging means may be free to rotate about a substantially vertical axis.

Preferably a steering system is included, and connected to at least one of the ground engaging means, such that it's orientation about a substantially vertical axis can be influenced.

Preferably the steering control or steering wheel is situated in or adjacent to the cockpit of the amphibious vehicle.

More preferably the steering system is synergistic with the amphibious vehicle's marine steering mechanisms.

Preferably the steering system for any ground engaging means is disconnected from each ground engaging means when each ground engaging means is stowed and during the greater part of the extension or retraction processes.

Preferably means are provided to self-align any steerable ground engaging means as required for retraction, stowage and extension.

Preferably the means to self-align the ground engaging means is a spring mechanism, arranged to return the ground engaging means to the desired alignment when no external load is applied, i.e. during the extension or retraction phases.

Optionally a single guide or a system of guides causes the ground engaging means to align as required.

Preferably a connection is made between any steerable ground engaging means and the steering system at or near the point of full extension of the corresponding undercarriage assembly or assemblies, and similarly the connection is broken at or near the beginning of the retraction phase of the corresponding undercarriage assembly or assemblies.

Preferably a steering driven member on each steerable undercarriage assembly, connected to or able to influence the orientation of the ground engaging means supported thereon, mates with a steering drive member positioned within the hull of the amphibious vehicle, which is in turn influenced by a steering system, and the mating of the two members being such as to allow rotational forces to be transmitted from one to the other.

Preferably a sealing method is incorporated between the steering drive member, and the surrounding fixed structure of the hull, to prevent or significantly reduce water ingress.

Preferably the steering drive member is set within a recess in the hull, to cause minimal interruption to the streamlined shape of the hull.

Preferably the mating portions of either one or both of the steering driven members and the steering drive members incorporate(s) self-aligning features, such that angular mismatches between the members will be resolved as they mate.

Optionally a steering actuator forms part of at least one retractable leg assembly.

Optionally the steering actuator that forms part of at least one retractable leg assembly is an electrically powered rotary actuator.

As a further option the steering actuator that forms part of at least one retractable leg assembly is an hydraulic actuator.

Optionally the steering control inputs to each steering actuator that forms part of a retractable leg assembly, are transmitted using electrical, hydraulic or pneumatic means.

Preferably any steerable ground engaging means are positioned towards the forward end of the amphibious vehicle.

Optionally any steerable ground engaging means are positioned towards the aft end of the amphibious vehicle.

As a further option, all of the ground engaging means are steerable.

Preferably the steering system is powered, or power assisted.

Preferably the powered or power assisted steering system includes an hydraulic or electrical actuator to alter the angular disposition of any steerable ground engaging means, to assist the steering of the amphibious vehicle when supported on the undercarriage assemblies.

Preferably the control of the hydraulic or electric actuator is synergistic with the amphibious vehicles marine steering system.

Optionally the steering system can be isolated from any steerable ground engaging means to allow the amphibious vehicle to be towed by another vehicle on land, by opening a by-pass circuit in any hydraulic actuators, or removal of a pin or pins thereby breaking the mechanical connection between any steerable ground engaging means and the rest of the steering system.

In a preferred form, the invention further includes a system of undercarriage assemblies for an amphibious vehicle, wherein one or more of the ground engaging means supported thereon is provided with motive power.

Preferably the motive power is provided by an internal combustion engine.

Optionally the motive power is provided by an electric motor or an hydraulic motor or by any combination of internal combustion, electric, or hydraulic motors Optionally the motive power may be provided by the amphibious vehicle's marine engine, the power being extracted by a driven shaft, by hydraulic or pneumatic power from a pump driven by the engine, or in the form of electrical energy supplied from an alternator or generator driven by the engine.

Optionally batteries may be incorporated to supply electrical energy for the production of motive power.

Optionally the batteries may be charged from a generator driven by an internal combustion engine.

As a further option, electrical power from a ground based system may be used during operations close to or on-shore.

Preferably a clutch and torque converter or gearing system, or combination of these is employed to control and vary the torque produced by the engine before it is transmitted to the driven ground engaging means.

Preferably any two ground engaging means positioned on opposite sides of an amphibious vehicle are driven from a common transverse shaft.

Preferably the common transverse shaft is driven via a differential gearbox.

Optionally the differential gearbox is a limited slip differential gearbox, or includes a differential lock.

Preferably the portion of the power drive train that travels down each leg to a ground engaging means is housed within the leg.

More preferably the drive train within each leg is encased to substantially prevent water entering the drive chain, and the aperture where the final stub axle passes through the encasement contains a rotary seal.

Preferably the portion of the drive train that travels down any legs uses chains and sprockets.

Optionally the portion of the drive train that travels down any legs uses pulleys and belts.

As a further option, the portion of the drive train that travels down any legs uses drive shafts and bevel gearboxes.

Optionally the portion of the drive train that travels down any legs uses flexible drive shafts.

Optionally at least one ground engaging means may be driven by a motor located adjacent to one end of the leg, the ground engaging means being connected adjacent to the other end of the leg, the motor being hydraulically, electrically, or pneumatically driven, or the motor being an internal combustion engine.

Preferably the portion of the power drive train that travels down each leg to a ground engaging means is housed within the leg.

More preferably the drive train within each leg is encased to substantially prevent water entering the drive chain, and the aperture where the final stub axle passes through the encasement contains a seal.

Preferably the portion of the drive train that travels down any legs uses chains and sprockets.

Optionally the portion of the drive train that travels down any legs uses pulleys and belts.

As a further option, the portion of the drive train that travels down any legs uses drive shafts and bevel gearboxes.

As yet a further option, the portion of the drive train that travels down any legs uses flexible drive shafts.

Optionally at least one ground engaging means may be driven directly by a motor located adjacent to or within the ground engaging means, the motor being hydraulically, electrically, or pneumatically driven.

Optionally the drive train, between a motor located adjacent to or within a ground engaging means and the ground engaging means, can pass through a reduction gearbox, separate from or integral with the ground engaging means.

Optionally the motive power is provided by manual means, for example but not limited to an arrangement of pedals, shafts, sprockets and drive chains to the driven ground engaging means.

Preferably one or more of the ground engaging means can be retarded or stopped completely by braking mechanism or mechanisms.

Preferably the braking mechanism or mechanisms incorporate friction pads.

Preferably the braking mechanism or mechanisms are situated remote from the wheels to reduce the possibility of water ingress.

Optionally the braking mechanisms are situated adjacent to the wheels and are protected from water ingress.

Optionally wet braking mechanisms are used.

Optionally separate braking controls allow for differential braking between port and starboard brake assemblies to assist with directional control.

In a preferred form, the invention further includes an engine cooling system for a marine engine, the system including an air cooled re-circulating cooling means adapted to cool the engine coolant fluid.

Preferably the system further includes a reservoir of coolant fluid.

Preferably the system includes fan means, such as an electric or motor driven fan to pass air over an air cooled heat exchanger means.

In a preferred form, the system further includes one or more valves provided within the engine coolant liquid lines, the one or more valves being operative to bypass the water cooled engine coolant flow and divert the coolant flow through the air cooled re-circulating cooling means.

In a preferred form, the invention further includes a silencer for an outboard motor, the silencer including a body adapted to be located in or about the hub of a propeller, and the body having one or more baffle openings or passageways therein for passage of exhaust gases therethrough, and attachment means being provided to attach the silencer to the propeller.

In a further aspect the invention may broadly be said to consist in an amphibious vehicle including one or more of the retractable undercarriage assemblies referred to in the preceding paragraphs.

In yet a further aspect the invention may broadly be said to consist in a microprocessor based control system, designed to control the sequence the uplocks, extension, downlocks, and retraction phases, to limit extension of the gear at high boat speeds, to disable power to the wheels when not down and locked, among other control requirements.

In yet a further aspect the invention may broadly be said to consist in an amphibious vehicle having ground engaging means wherein the vehicle is equipped with, or has provisions to accept, most or all necessary features to make the vehicle capable of gaining roadworthiness in accordance with local regulatory requirements, as a self propelled vehicle, or as a towed unit.

Optionally the amphibious vehicle is equipped with, or has mounting and electrical supply provisions for, among other features, some or all of; headlights, tail lights, indicator lights, brake lights, reversing lights, parklights, horn or warning device, direct acting brakes, handbrake, sound and gas emission control, seatbelts, registration plate, certificate of registration, insurance, or fitness holder, rear view mirrors, and windscreen wipers.

In another aspect the invention may broadly be said to consist in a method of launching or landing an amphibious vehicle, the method including the steps of providing an amphibious vehicle with a plurality of retractable undercarriage assemblies as set forth in one or more of the preceding statements, extending the wheel assemblies when the amphibious vehicle is on land to enable the amphibious vehicle to be moved along roads and over land and the shoreline or tidal flats and into a body of water using the wheels, then retracting the wheel assemblies when the amphibious vehicle is in the water. After use of the vehicle in the water, the wheels can then be extended and a transition made from water to dry land, the vehicle can then be moved over the land back to parking place away from tidal influences, or a shed, or along the road to a remote storage location.

In a preferred form the invention forms an amphibious vehicle having a boat hull which has at least three ground engagement means connected thereto, each ground engagement means capable of being disposed in an extended position in which the boat hull may be supported by the ground engagement means on a ground surface, and each ground engagement means capable of being disposed in a retracted position in which the amphibious vehicle may be used in water without substantial hydrodynamic interference from the ground engagement means, and wherein a forward leg assembly, comprises a first rigid elongate member, one end of the first member being pivotally attached to a point on the hull, and the other end being connected to a ground engagement means supported thereon, so that the ground engagement means can be moved between the retracted location adjacent to the bow of the vehicle and the extended location, in an arc, without passing through any of the primary structure of the hull of the amphibious vehicle.

Preferably the forward leg assembly includes a second substantially rigid elongate member, one end of each member being pivotally attached to points on the hull distal from each other, and the other end of each member being connected about the ground engagement means supported thereon, the leg assembly forming a substantially "V" shape, so that the ground engagement means can be moved between the retracted location adjacent to the bow of the vehicle and the extended location in an arc, without passing through any of the primary structure of the hull of the amphibious vehicle.

Preferably at least one pivotally attached leg has engagement means, at a location distal from the leg's pivot attachment point, so that the leg can be engaged with, and be restrained in at least one direction by, a connection to the hull of the amphibious vehicle.

Preferably at least one of the legs, at a location distal from the moveable attachment to the hull structure, also comprises a member shaped to mate with the lower surface of the hull, at the location where the leg contacts the hull, and of sufficient area to spread and transfer loads between the hull and the ground engagement means during land supported operations, without causing damage to the hull structure.

Preferably an actuator mounted and acting within the exterior skin of the hull, operates to move at least one of the legs from the retracted position to the extended position and/or in the opposite direction.

Preferably at least one of the ground engagement means is steerable.

Preferably at least one of the ground engagement means is a powered ground engagement means.

Preferably at least one of the ground engagement means comprises at least one wheel and tyre assembly, and said wheel and tyre assembly, when in the retracted position, protrudes from the hull of the amphibious vehicle in such a way that the tyre(s) act as a bumper.

Preferably the amphibious vehicle has one or more hollow cowlings around the periphery of the vehicle, capable of at least partly covering the wheels when in the retracted position.

Preferably the vehicle is powered by a marine engine adapted to provide power to drive any of the driven ground engagement means.

Alternatively the invention provides retractable undercarriages for connection to a boat in the manner described above.

The invention may also broadly be said to consist in any new feature, or combination of features disclosed herein and variations thereof.

DRAWING DESCRIPTION

Figure 2:
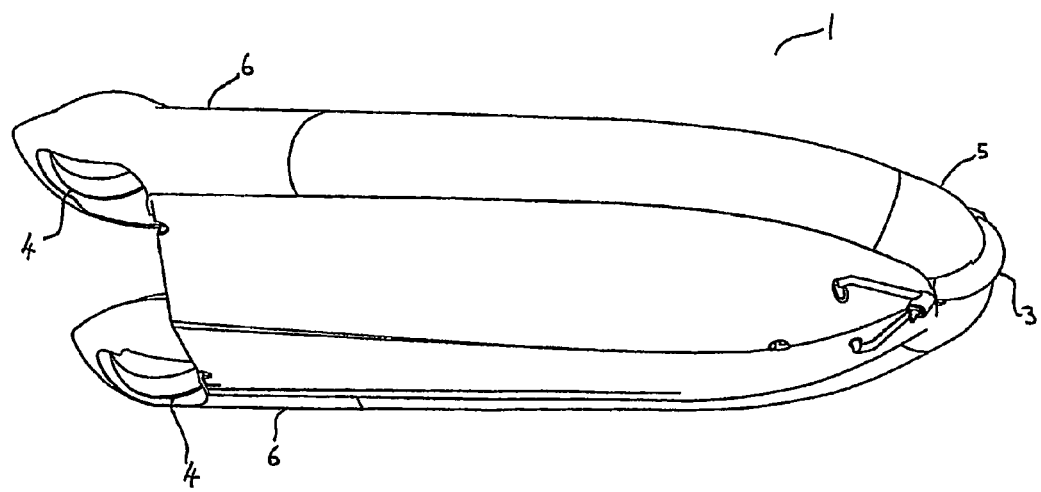
Figure 3:
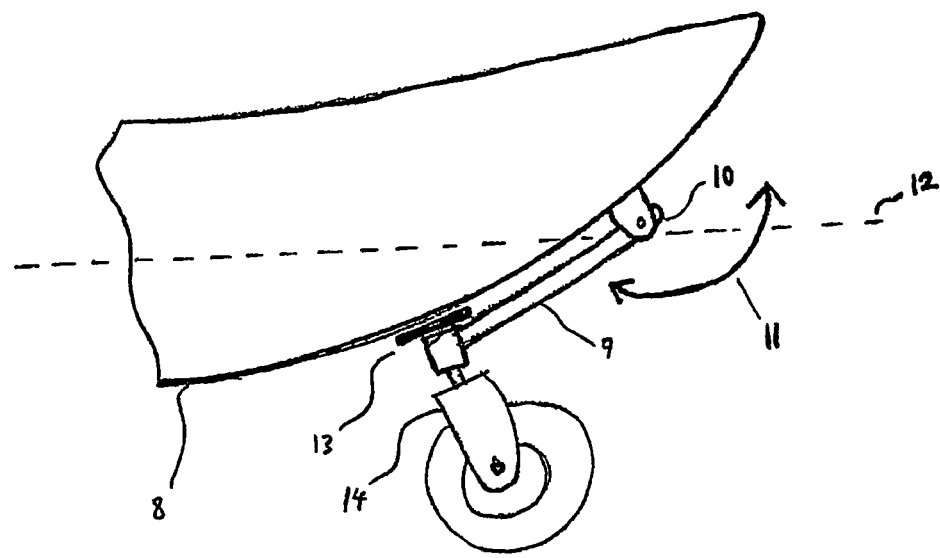
Figure 3A:
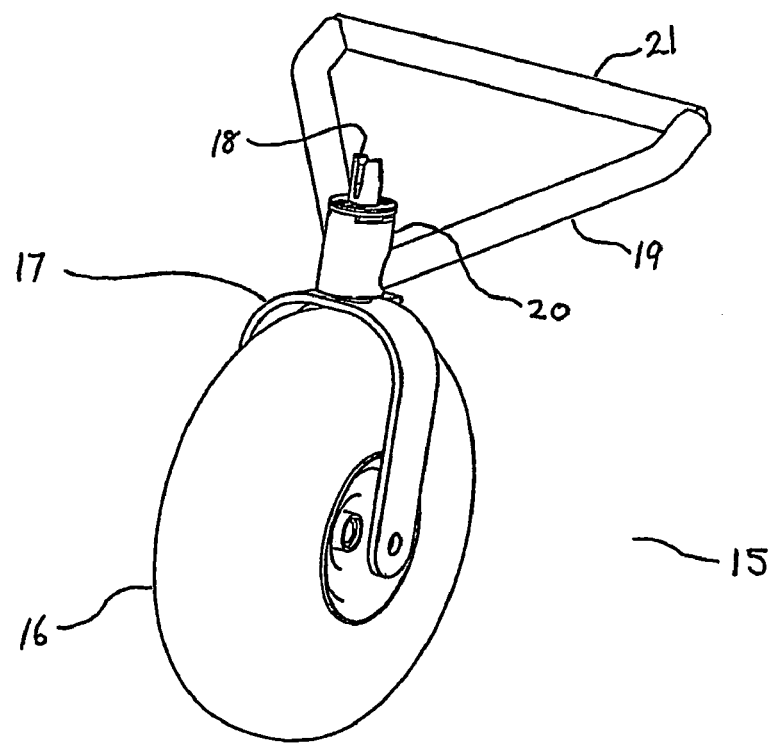
Figure 4:
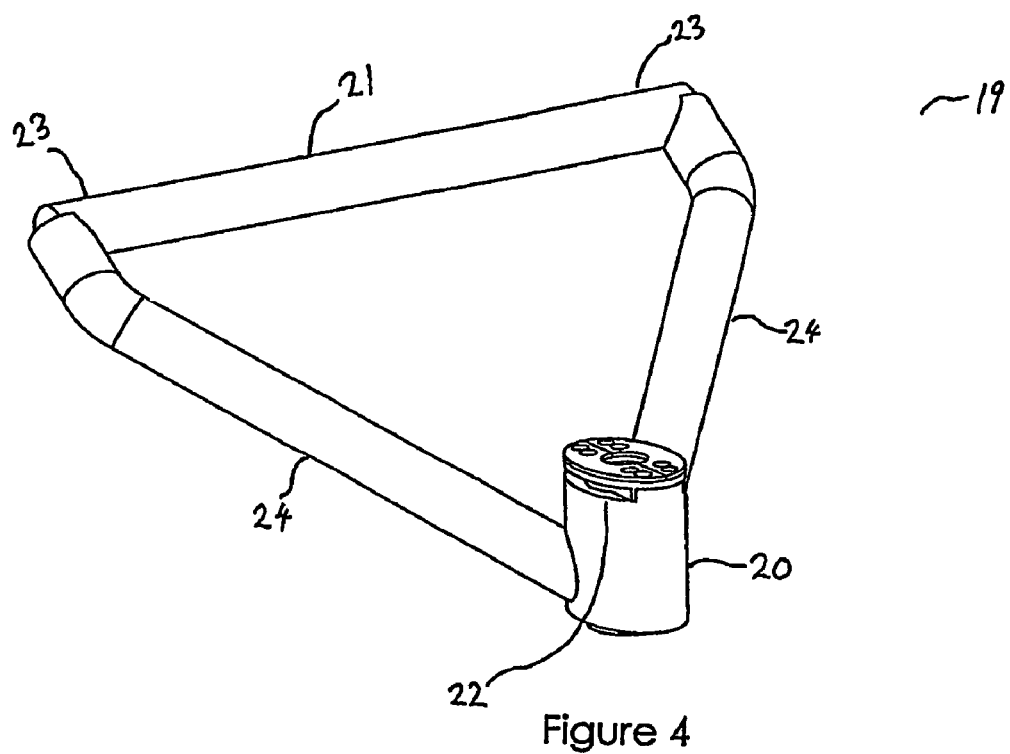
Figure 5:
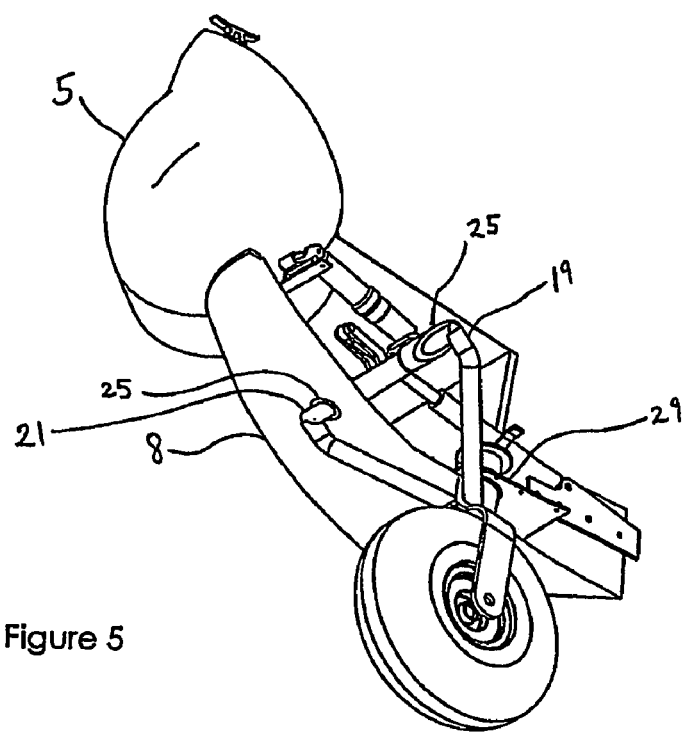
Figure 6:
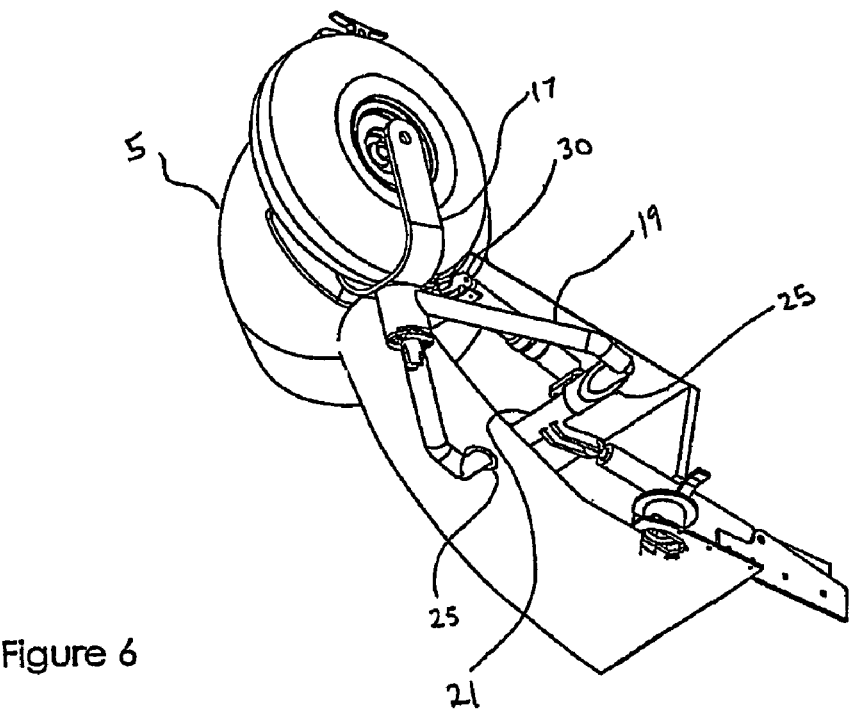
Figure 7:
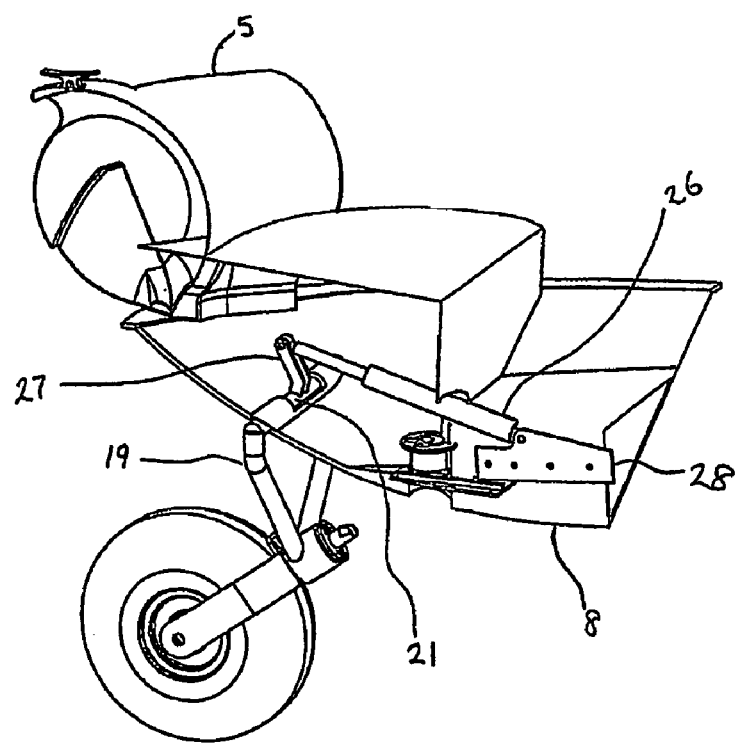
Figure 8:
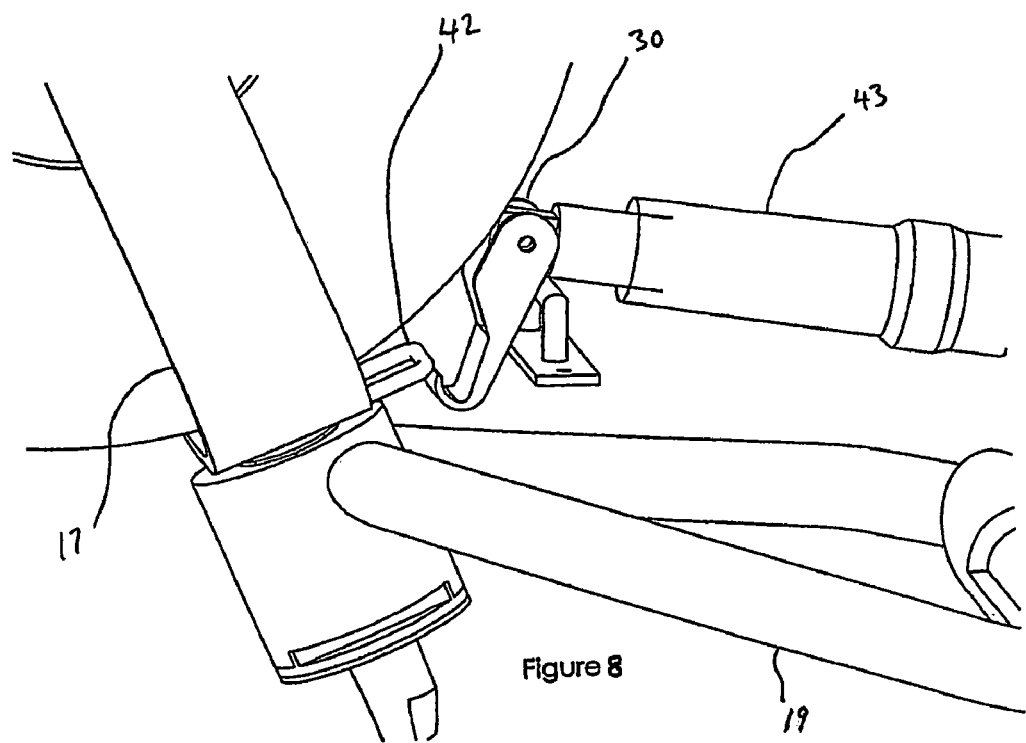
Figure 8A:
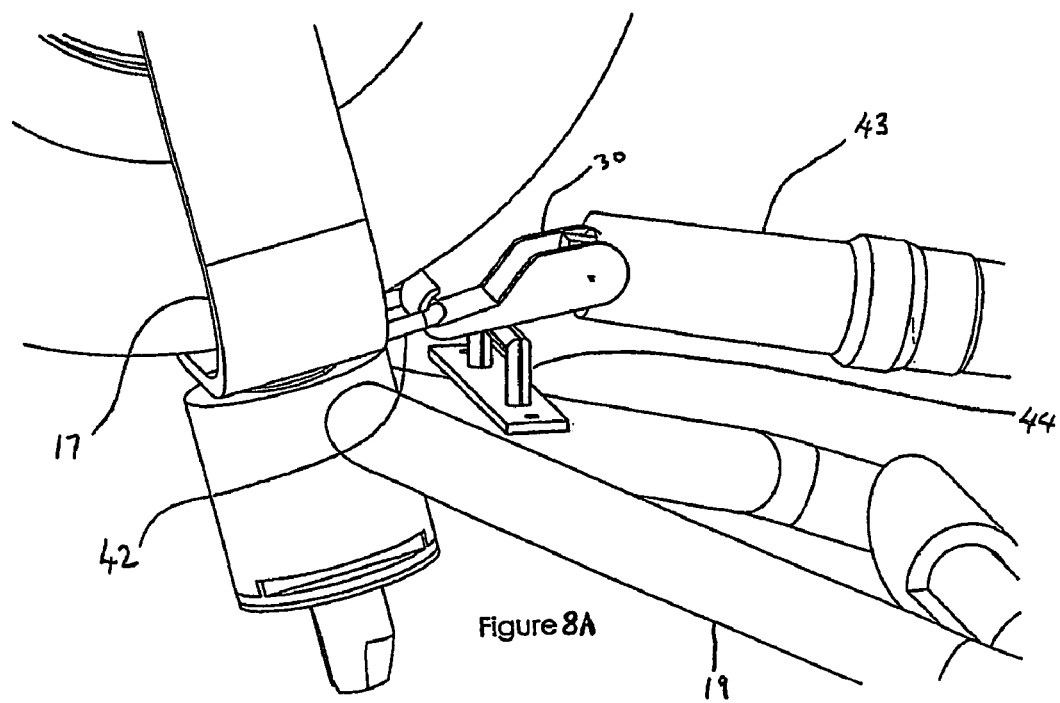
Figure 8B:
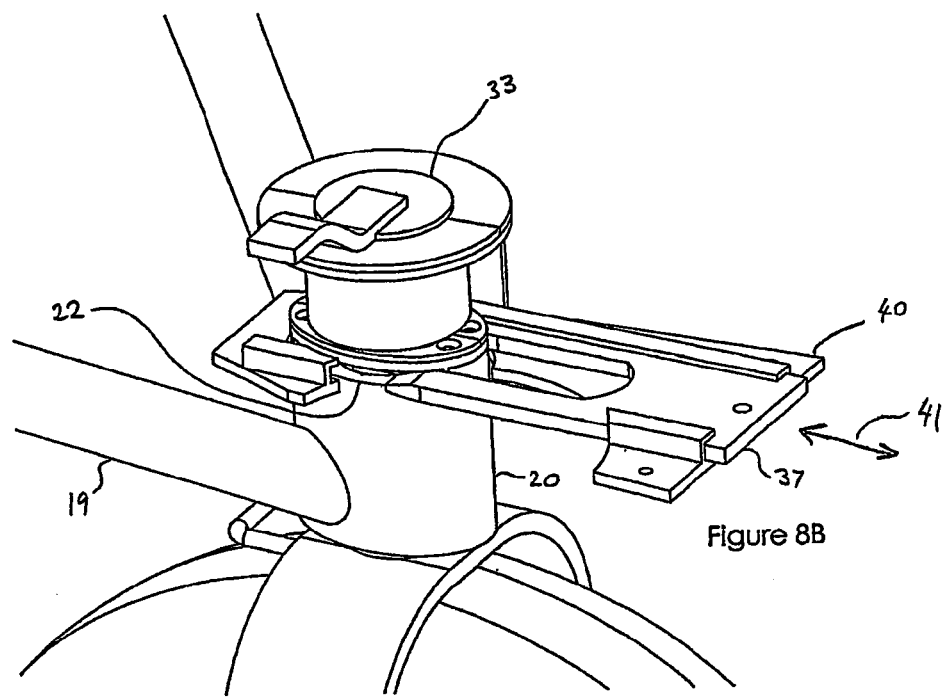
Figure 8C:
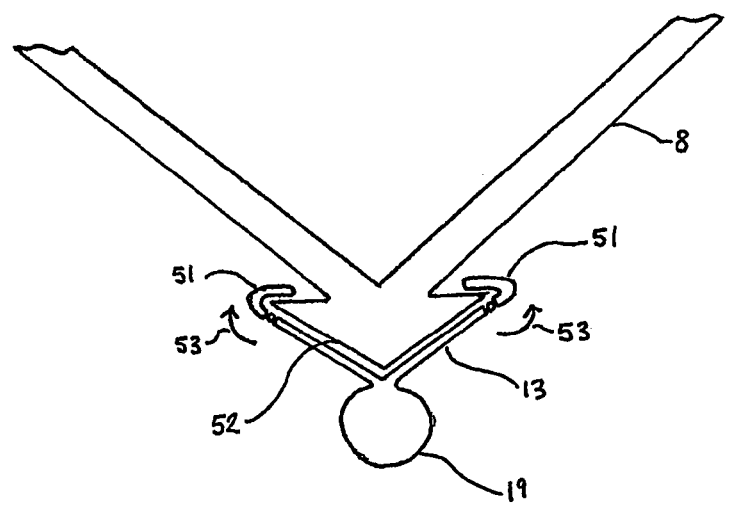
Figure 9:
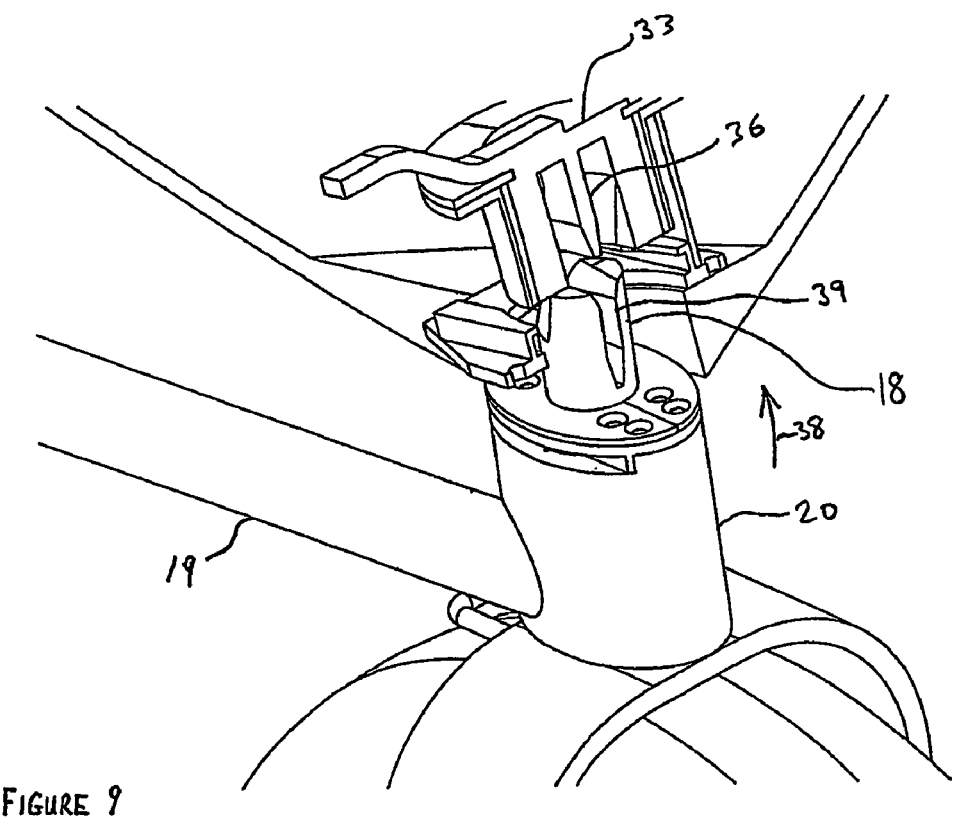
Figure 9A:
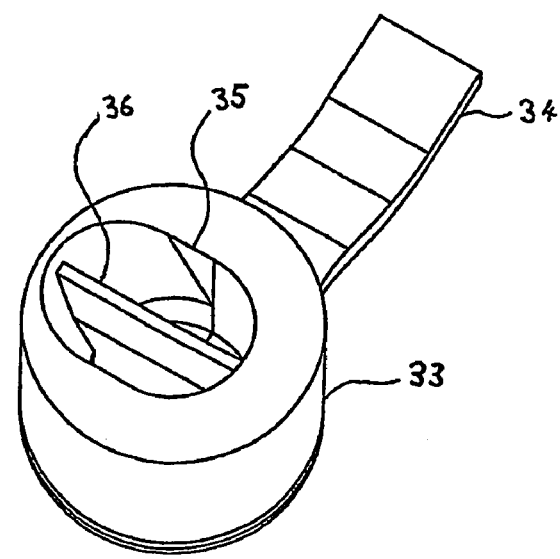
Figure 10:
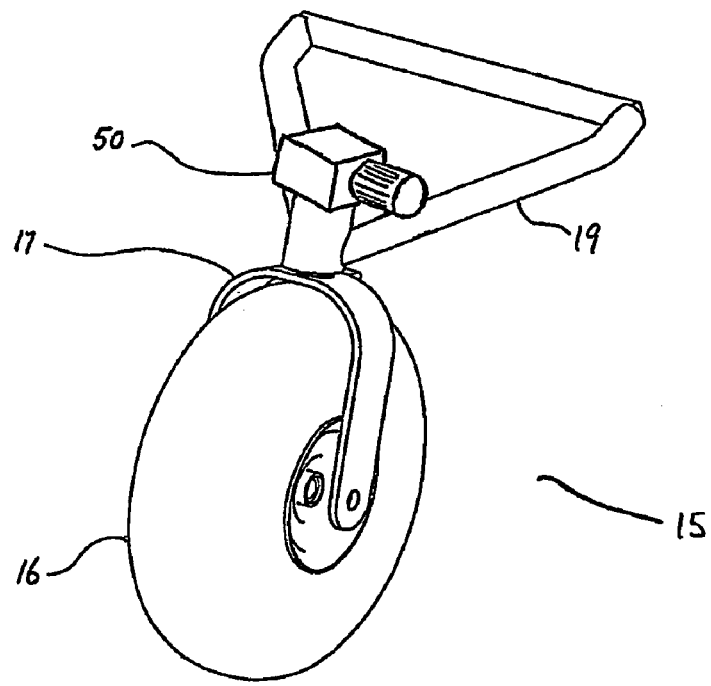
Figure 11:
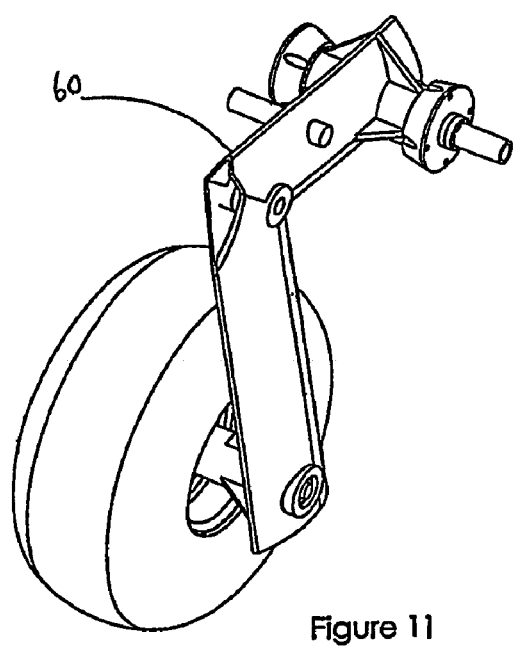
Figure 12:
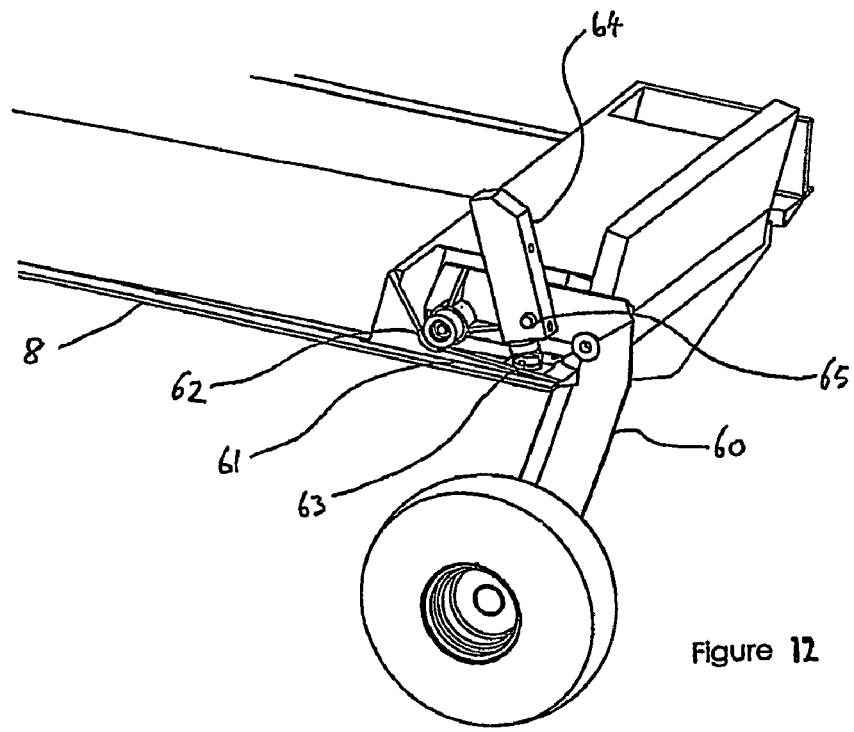
Figure 13:
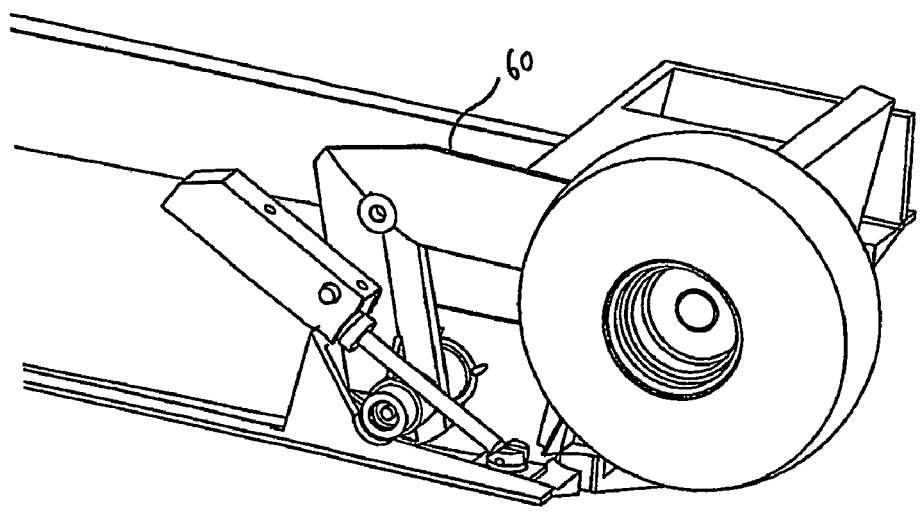
Figure 14:
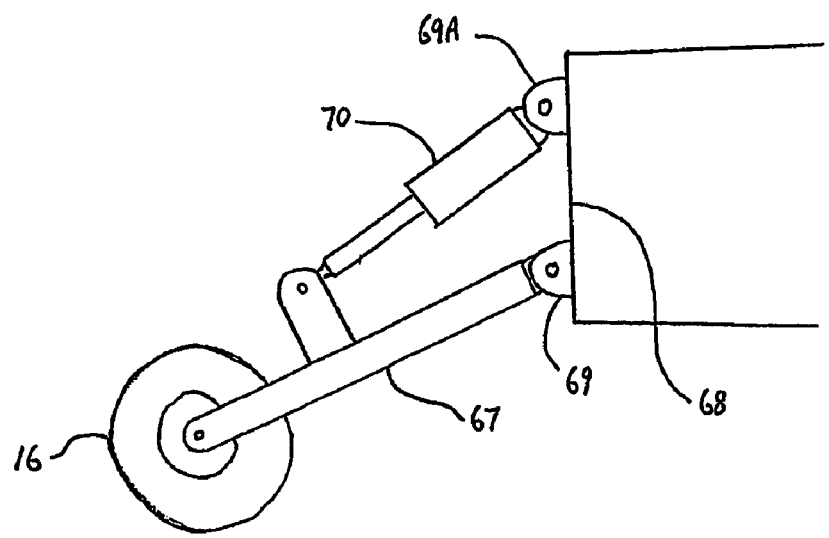
Figure 15:
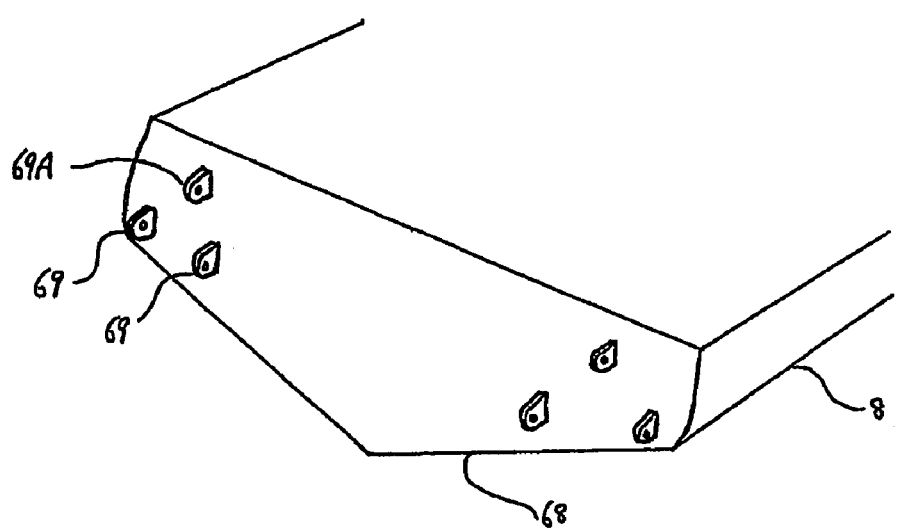
Figure 16:
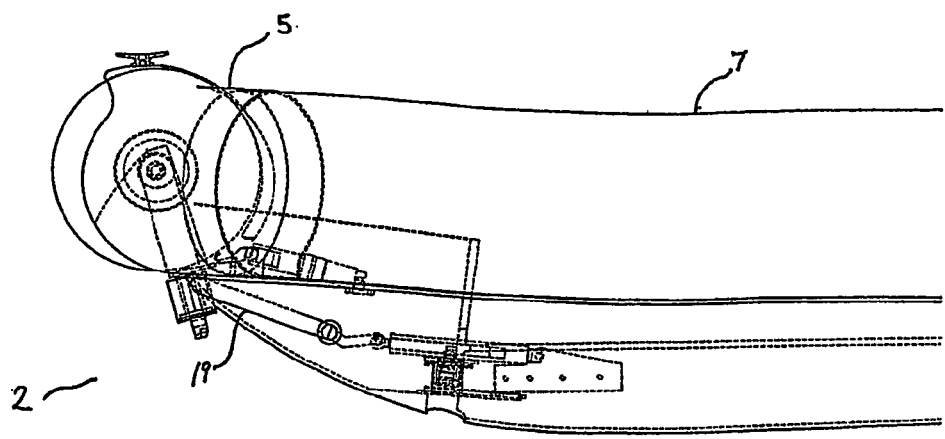
Figure 17:
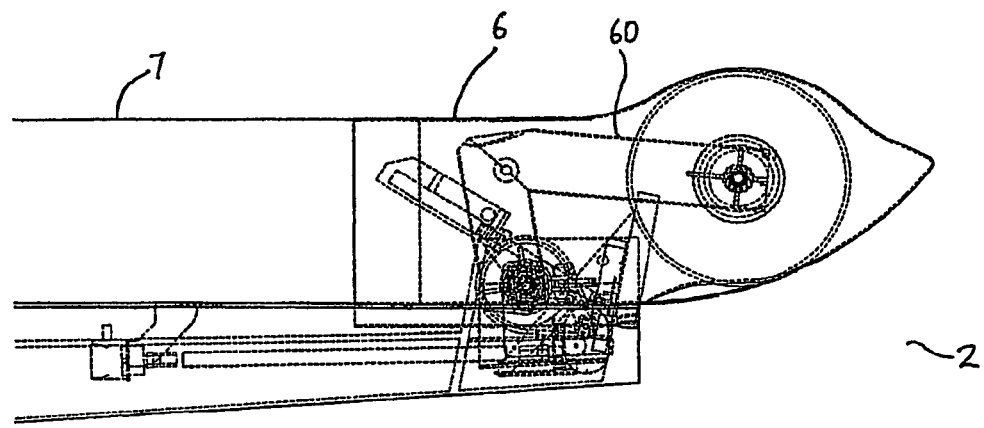
Figure 18:
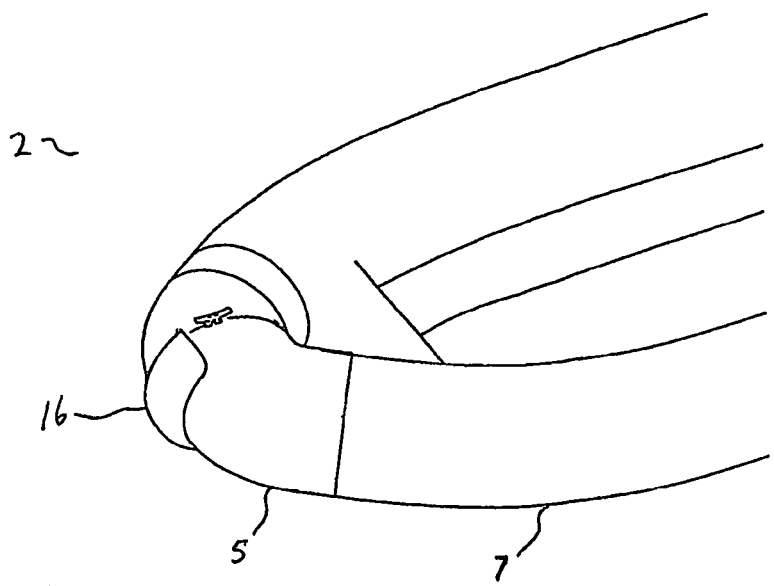
Figure 20:
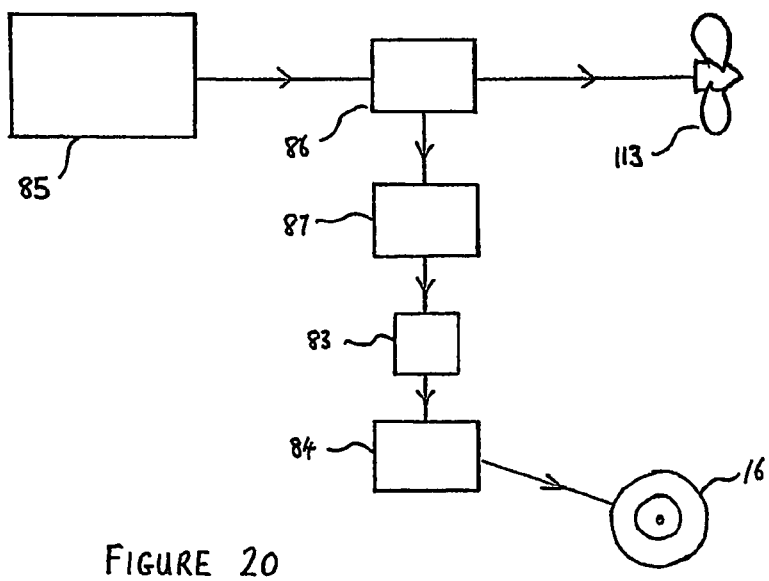
Figure 21:
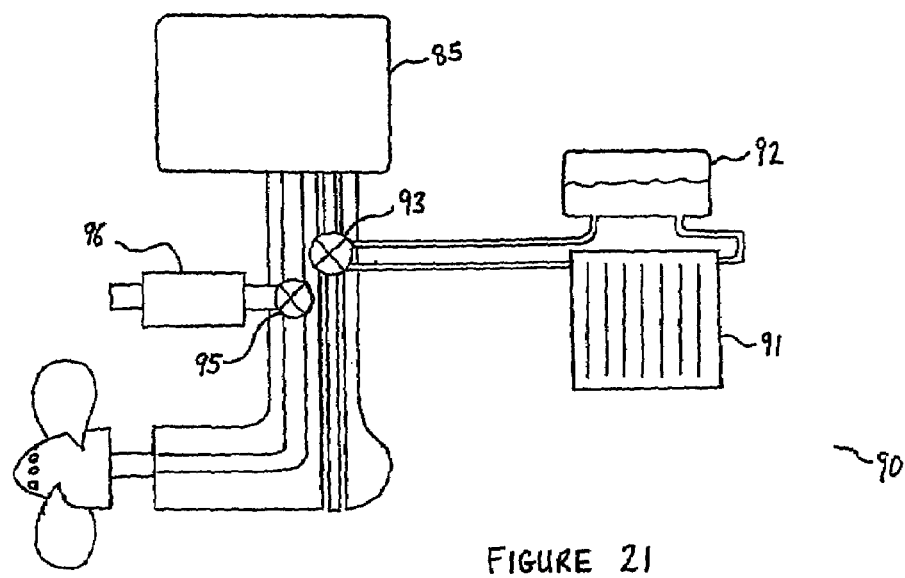
Figure 22:
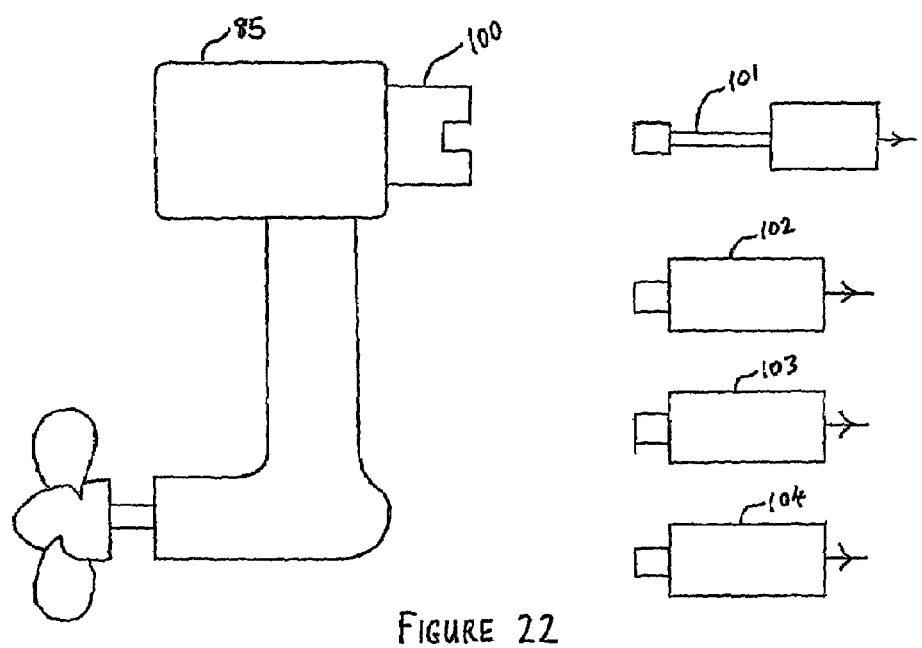
Figure 23:
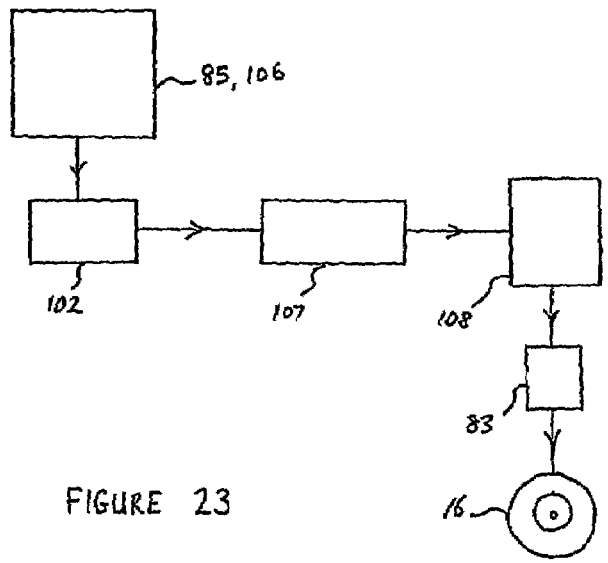
Figure 24:
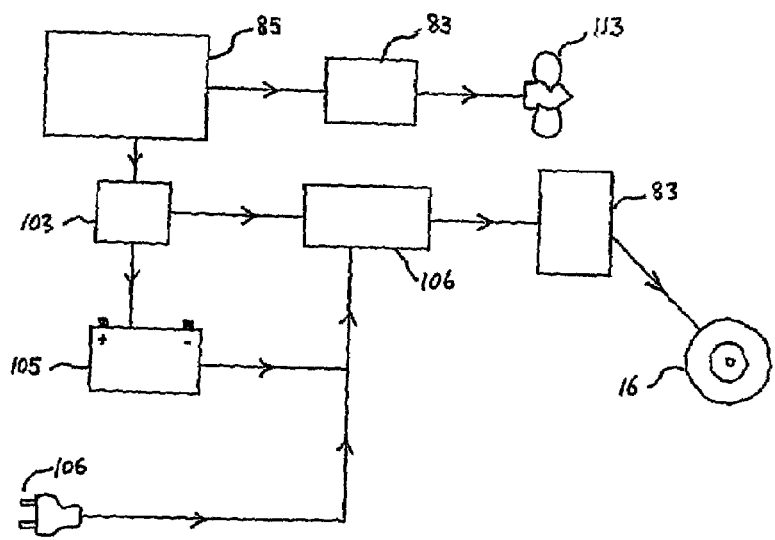
Figure 25:
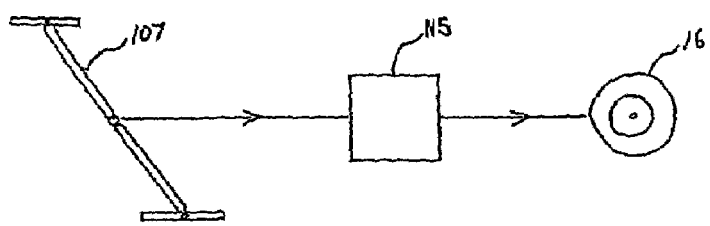
Figure 26:
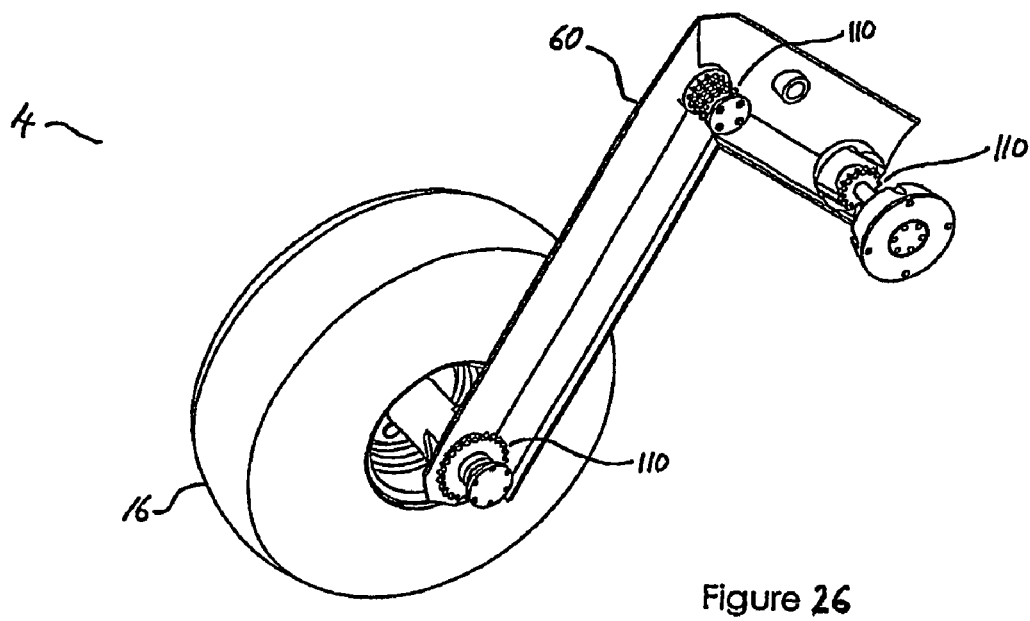

FIG. 1 inflatable craft assembly, legs extended.
FIG. 2 inflatable craft assembly with legs retracted.
FIG. 3 simple leg assembly.
FIG. 3A triangular shaped leg assembly.
FIG. 4 triangular shaped leg structure.
FIG. 5 cutaway view of the leg assembly, three point attachment, in extended position.
FIG. 6 cutaway view of the leg assembly, three point attachment, in retracted position.
FIG. 7 cutaway view of the leg assembly, internal extend/retract actuator.
FIG. 8 leg assembly, uplock mechanism, ready to engage.
FIG. 8A leg assembly, uplock mechanism, engaged.
FIG. 8B partially cutaway view of the leg assembly, downlock mechanism.
FIG. 8C cross section of boat hull showing alternative downlock arrangement.
FIG. 9 partially cutaway view of the leg assembly and the connection with the steering system.
FIG. 9A steering system, mating adapter.
FIG. 10 leg assembly, with integrated steering actuator.
FIG. 11 "7" shaped leg assembly.
FIG. 12 partially cutaway view of the "7" shaped leg assembly in extended position.
FIG. 13 partially cutaway view of the "7" shaped leg assembly in retracted position.
FIG. 14 straight leg mounted on vertical bulkhead.
FIG. 15 vertical bulkhead attachment points.
FIG. 16 x-ray view of the stowage of forward leg and wheel assembly within the lines of the inflatable tubes.
FIG. 17 x-ray view of the stowage of aft leg and wheel assemblies within the lines of the inflatable tubes.
FIG. 18 tyre forming bumper
FIG. 19 schematic, motive power using separate stationary engine.
FIG. 20 schematic, marine engine modified with transmission providing "Power Take-Off" shaft.
FIG. 21 schematic, marine engine suited to operation out of the water.
FIG. 22 schematic, marine engine, power take-off options.
FIG. 23 schematic, hydraulic drive train.
FIG. 24 schematic, electrical drive train.
FIG. 25 schematic, manual drive train.
FIG. 26 partially cutaway view of the drive train inside leg assembly
FIG. 27 disc brake on shaft drive train.

DETAILED DESCRIPTION OF PREFERRED EMBODIMENTS

Overview

The invention provides a steerable, driven and retractable undercarriage system which is suited to transportation of a boat over a land surface when the undercarriage system is in an extended position, and the undercarriage system being capable of being disposed in a retracted position to allow the boat to operate on water as normally as possible.

Since at least one of the wheels is driven, and at least one of the wheels is steerable or pivots, the invention provides a system that transports a boat from water to land, or land to water for a variety of purposes. For example, the system allows an amphibious vehicle user to visit a beach location which may have no launching ramp facility, wharf or jetty, and allow the user to manoeuvre the boat out of the water and disembark from the amphibious vehicle without the user needing to touch the water at all. In particular, the amphibious vehicle does not then need to be tied or anchored or have its hull dragged over a beach or rock strewn surface in order to secure the vessel, while the user retrieves or parks a boat trailer. Furthermore, provided an appropriate road going trailer is provided, the invention may be used to enable the boat to be effectively driven off the boat trailer and from there into the water.

The invention also provides an amphibious vehicle of many forms as detailed below depending in the design or configuration of the undercarriage, and how it is stowed, the steering and braking system used, and the motive power and drive train employed.

A first preferred embodiment, see paragraph 1.0 below, is an inflatable craft, with an having a three wheeled retractable undercarriage system, having a steerable front leg assembly, and two powered aft leg assemblies, the ground engagement means being powered via drive trains within the leg assemblies.

A second preferred embodiment, see paragraph 2.0 below, is a jet-boat having a similar undercarriage, steering and braking system, and drive train, as in the first preferred embodiment, but where the motive power is provided from a modified main engine and transmission, and where the wheels and legs are stowed within adaptations to the rigid hull.

A third preferred embodiment, see paragraph 3.0 below, is a rigid hulled craft, with an outboard motor as commonly used as pleasure craft, having similar undercarriage, steering and braking system, and motive power and drive train, as in the first preferred embodiment, but where the stowage of the wheels and legs is similar to the second preferred embodiment.

A fourth preferred embodiment, see paragraph 4.0 below, is an inflatable or rigid hull having similar undercarriage, steering and braking systems, as in the first preferred embodiment, and having stowage of the wheels and legs similar to the first and third preferred embodiments, but having the motive power provided by a modified outboard motor, and optionally a modified drive train wherein a flexible drive shaft is used to transfer power from the motor into the drive train.

A fifth preferred embodiment, see paragraph 5.0 below, is an inboard powered craft, having a shaft driven propeller, or a stern-drive unit, and having a similar undercarriage, steering and braking system, and power train, as used in the first preferred embodiment, but having stowage of wheels and legs, and motive power provided as in the second preferred embodiment.

1.0 FIRST EXAMPLE

An Inflatable Craft

FIG. 1 shows a first preferred embodiment of the amphibious vehicle 1, comprising an inflatable craft 2, fitted with a single nose undercarriage assembly 3 and two aft undercarriage assemblies 4, providing means for the craft to travel over land. Fibreglass cowlings are provided towards the front of the craft and towards the rear 6. The cowlings are shaped to conform to the lines of the inflated tubes 7. The leg assemblies are structurally attached to the hull 8 of the craft. A primary structure is any structure, the failure of which will impair the safety of the vehicle when operating within its design envelope, for example but not limited to, the hull or hulls, any keel beam structure, transverse frames, main bulkheads and/or chassis.

FIG. 2 shows the same craft 1 with the undercarriage assemblies 3 & 4 retracted and stowed within the cowlings 5 & 6, as they would be during the predominant use of the craft as a water-borne vessel.

1.1 Nose Leg Assembly

FIG. 3 shows a simple leg assembly 14, comprising at least an elongate member 9 pivoting about a point 10 external to the boat hull 8. The leg can rotate through arc 11 to a stowage location above the waterline 12. The leg assembly also comprises a substantially planar member 13 which is shaped to conform to the shape of the hull 8, and sized to distribute the loads from the leg assembly 14 into the hull 8 without undue damage to the hull. The leg assembly 14 can be manually rotated through arc 11, or caused to move by simple mechanical means, not shown, for example a rope and pulleys, or by the use of powered mechanical means, not shown, for example a rotary actuator or linear actuator.

FIG. 3A shows a substantially triangular leg assembly 15, comprising a tyre and wheel assembly 16 mounted within a fork 17 on an axle, not shown. The fork 17 is further pivotally supported within a bearing support assembly 20 on one end of a substantially triangular shaped leg assembly 19. The wheel and fork assembly pivot about the longitudinal axis of the shaft 18 which rotates within the bearing support assembly 20. The substantially triangular leg assembly further rotates about the longitudinal axis of transverse shaft 21, when the leg assembly rotates from a retracted position to an extended position. Clearly the fork and single wheel could be substituted by a longer shaft 18, supporting an axle, or a truck assembly comprising more than one axle, upon which more than one wheel is pivotally mounted.

FIG. 4 shows the substantially triangular shaped leg assembly 19 comprising at least a transverse shaft 21 which passes through the craft, and two elongate support members 24 attached to at least one bearing support assembly 20. The triangular shaped leg pivots about the longitudinal axis of the transverse shaft 21 when the leg assembly rotates from the retracted position to the extended position. The transverse shaft 21 is supported within bearings in the hull, bearing on surfaces 23. Slots 22 in the bearing support assembly 20 are used by the downlock mechanism shown below.

FIG. 5 shows the leg assembly 19 in the extended position, that is in the configuration for navigating land surfaces. In this configuration the gear assembly is supported in three locations, being the two bearing supports 25, one at each end of the transverse shaft 21, and the point where the bearing support assembly engages with the hull 29.

FIG. 6 shows the leg assembly 19 in the retracted position, that is in the configuration for navigating water surfaces. In this configuration the gear assembly is supported in three locations, being the two bearing supports 25, one at each end of the transverse shaft 21, and the point where the uplock mechanism 30 captures a lug on the fork assembly 17.

It can be seen from both FIGS. 5 and 6 that the load from the nose leg 19 is spread over three relatively widely spaced points, thereby necessitating minimal stiffening to the hull 8 to absorb the loads from the nose leg 19 during navigation over land, and the loads from supporting the weight of the nose leg assembly during navigation over rough water surfaces.

It can also be seen from FIGS. 5 and 6 that this nose leg arrangement, and the path of travel, results in relatively little disruption to the usual lines of the hull. The main disruption occurs where the leg contacts the hull in the down position and engages with the optional steering mechanism, the other disruption being the optional recess in the hull above the water line where the wheel is faired. In each case the disruption to the hull is significantly less than comparible systems using doors or flaps to allow undercarriage components to pass through the hull, and requiring sealing afterwards. Significant advantages result from this system with regard to lower maintenance, but also less operating difficulties, for example less mechanisms to tangle with weed, or doors and openings to leak, or mis-fair causing drag problems FIG. 7 shows the position and the nature of one form of the mechanism used to drive the nose leg assembly between the extended, and the stowed, positions. An actuator 26 acts via levers 27 to rotate shaft 21, causing the movement of the leg assembly 19. It can be seen that the actuator 26 acts, and is located, within the drier environment inside of the hull 8 of the craft. This is highly advantageous in that the most complex mechanisms are not exposed to salt water.

FIGS. 8, 8A and 8B show uplock and downlock mechanisms

FIGS. 8 and 8A show an example of an up-lock mechanism. In FIG. 8 an actuator 43 drives a hook 30 to engage and capture a lug 42 which is attached to the fork 17. FIG. 8A shows the actuator 43 pulling the hook 30 to firmly secure the leg assembly 19. The required rotational movement of the hook 30 is achieved by drawing it over cam 44.

As with the retract actuator 26, it can be seen that the down lock and the uplock mechanisms are substantially located within the drier environment within the hull of the craft.

FIG. 8B shows a mechanism used to lock the leg assembly 19 in the extended position. A fork shaped plate 37 is moved in direction 41 to engage or disengage with slot 22 in bearing support assembly 20. The plate 37 is guided and constrained within guide 40.

It was found to be advantageous to incorporate the downlock mechanism with the steering engagement mechanism. This ensured positive steering engagement and provided a suitably firm point in the crafts hull to transfer loads between the mass of the craft and the wheel upon which it was supported.

FIG. 8C shows an alternative locking arrangement in which at least one hook 51 attached to member 13, is actuated to move approximately as shown by arrow 53 to engage a recess or fitting 52 on the hull 8 of the craft.

1.2 Steering System

FIG. 9 shows the leg assembly 19 approaching the fitting 33 in direction 38. As the leg 19 reaches the fully extended position, a slot 39 in shaft 18, encompasses a tongue 36 of fitting 33, thereby enabling torque to be transmitted between the steering system and the shaft 18.

FIG. 9A shows the fitting 33 in more detail. The recess 35 in the fitting 33 is a cylindrical hole which has been elongated in the forward direction to allow the shaft 18 (not shown) to enter the recess 35 while travelling in a circular path. Tongue 36 is located centrally in the recess 35. A lever 34 connects with the steering system, allowing a torque to be transferred into fitting 33.

The fact that the steering disengages as soon as the nose leg leaves the down and locked position when being retracted is of great benefit as it allows the wheel to be stowed in a narrow recess with no chance of inadvertent steering inputs causing conflict Since there is only a mechanical link to the steered wheel when it is in the down and locked position it is possible to provide a simple link into the crafts marine steering system, which needs no further disconnection means for use of the craft on water. The steering fitting 33, whether it be manually operated or power assisted, is supported in bearings and passes through a water seal (not shown) adjacent to the keel of the hull.

The synergy with the crafts marine steering system further reduces complexity, and the need for additional controls, and keeps the craft relatively simple to operate.

FIG. 10 shows an optional steering system in which a powered actuator 50 is mounted on the leg 19. The power source and steering control information (not shown) can be supplied in the form of electrical, magnetic, hydraulic or pneumatic means and can travel down the leg assembly 19, or be supplied via a socket in the hull of the craft.

1.3 Aft Leg Assembly

The preferred configuration for the aft leg assembly was found to be a "7" shaped leg 60, as shown in FIG. 11. A single rigid leg reduces complexity in that there are no folding mechanisms and associated extra pivots and bearings. Similarly a leg which maintains a single shape provides a simpler path down which to pass a drive train, as detailed below.

The "7" shaped legs allow a simple and compact structural attachment to the crafts hull. FIG. 12 shows a simple three point attachment system, positioned on a horizontal platform 61, forming part of the hull 8 of the craft. Two pivot points 62 (one shown, the other hidden) support one end of the leg, allowing it to pivot up and down, but restraining side loads. The third point, a lug 63 supports an hydraulic actuator 64 which is further connected to the leg 60 via pin 65 to raise and lower the leg. FIG. 12 shows the leg 60 in the extended position, for land navigation.

FIG. 13 shows the leg 60 in the retracted position for marine navigation.

From the two FIGS. 12 and 13 it can be seen that the leg and actuator move within a relatively compact volume, causing minimal loss of space within the craft. This has allowed the entire aft gear assembly, including actuator to be stowed within the lines of the primary inflation tubes in an inflatable craft. Also, since the three hard points are substantially situated along existing lines of strength in the hull, minimal stiffening or additional structure is required.

The preferred configuration provides an aft leg assembly which is both locked in the up position and the down position by self locking features within the hydraulic actuator at both positions.

In the preferred configuration, since the forward end of the leg pivots about a point fixed in space relative to the craft, it is relatively simple to introduce a drive shaft into the leg at this point. The drive train within the leg is detailed below.

FIGS. 14 and 15 show a less preferred configuration comprising three attachment points 69 and 69A, located on the vertical surface of a transom 68 for example. The two lower lugs 69 support each leg assembly 67, and an upper lug 69A supports one end of a hydraulic actuator 70.

1.4 Stowage of Legs and Wheels

With reference to FIGS. 16 and 17 it can be seen that the preferred stowage for the legs and wheels is substantially within the lines of the craft, and in the case of an inflatable craft 2, it was found to be possible to stow this equipment within the lines of the primary inflated tubes 7. Fibreglass cowlings 5 and 6 are incorporated to adopt the lines of the inflated tubes 7 and provide the slightly more complex cut-outs and shapes required to neatly stow the leg assemblies 19 and 60.

It can be seen from FIGS. 16 and 17 that the design allows the legs and wheels to be stowed using minimal room within the living space of the craft, and no doors or flaps are required to allow the leg assemblies to reach their stowage locations.

FIG. 18 shows an example where, in this case a front wheel 16, is stowed such that it protrudes from the crafts structure or cowling 5, so as to form a bumper, to assist with marine navigation of the craft in the vicinity of hard objects, wharves, jetties, other boats, etc.

1.5 Motive Power

Figure 19:
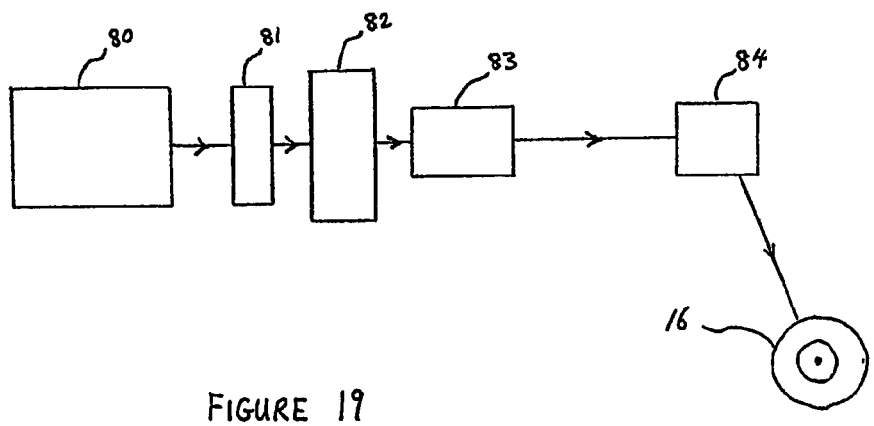

The motive power to drive the ground transport means may be provided by number of methods. A simple solution was found to be the use of a separate stationary engine suited to air cooling, but alternatives are to adapt the crafts own marine engine to also provide power for ground operations. Additionally stored electrical power, or power from a generator, or even electrical power from a ground based system could be used for short distances. Some of these options are described more fully as follows;

FIG. 19 is a schematic showing the use of a separate stationary engine 80. A relatively small internal combustion engine 80 is mounted in a convenient location within the craft, and via a suitable drive train, provides torque to the wheels. The drive train includes any of the following, a clutch 81, a torque converter 82, a multiple ratio gearbox 83, a differential gearbox 84. The completion of the drive train to the wheels 16 is detailed below, see FIG. 26.

FIG. 20 shows an alternative configuration, in which the crafts marine engine 85, which is normally used to drive the propeller 113, is also used as the motive power source for the ground engagement means 16 and a power take-off 87 driven from the transmission 86 is used. The power take-off shaft can be coupled to a transmission assembly, for example a multiple ratio gearbox 83, and/or a differential gearbox 84. The completion of the drive train to the ground engagement means 16 is detailed below, see FIG. 26.

FIG. 21 shows the marine engine 85, including a separate re-circulating liquid cooling system 90. When the craft is operated on dry land, the liquid cooling circuit is switched using valves 93 to draw liquid from the re-circulating cooling system 90, instead of drawing the liquid from the water in which the craft is operating. The re-circulating system 90 can include either or both of the following; an air cooled radiator 91, and a reservoir of coolant 92. Similarly the marine engine 85, if it has an under water exhaust silencing system is adapted to contain a valve which can redirect the exhaust gases to a muffler assembly, when the craft is not being operated in water.

1.6 Drive Train

From the many forms of motive power described in paragraph 1.5 above, a variety of drive trains can be employed to provide torque to the ground engagement means.

FIG. 22 shows an marine engine 85 designed to incorporate a power take-off means 100. The power take-off 100 can be a splined shaft for example, driven from the marine engine's transmission. From this power take-off means, a variety of types of drive train are able to be powered, flexible or rigid driveshaft 101, hydraulic pump 102, electrical generator 103, pneumatic pump 104 for example.

FIG. 23 shows a hydraulic drive train. The hydraulic energy can be supplied from a pump 102 powered by an internal combustion engine 85, or an electric motor 106. The hydraulic energy is used to drive an hydraulic motor 108, via valves 107, which can either drive the ground engagement means 16 directly, or via a transmission 83. The hydraulic motor 108 can be mounted directly beside or within the ground engagement means 16, or in the amphibious vehicle (not shown) at some convenient location adjacent to the top of the leg (not shown) supporting the ground engagement means 16.

FIG. 24 shows a drive train using electricity. The electrical energy can be supplied from a ground based supply 106, or from an electrical generator 103 driven by a marine engine 85, or simply from batteries, or any combination of these. A preferred source is battery storage 105, supplemented by an electrical generator 103 driven by the marine engine 85, allowing the battery system 105 to be replenished during marine operations. The electrical energy is used to drive an electric motor 106, which can either drive the ground engagement means 16 directly, or via a transmission 83. The electric motor 106 can be mounted directly beside or within the ground engagement means 16, or in the amphibious vehicle (not shown) at some convenient location adjacent to the top of the leg (not shown) supporting the ground engagement means 16.

FIG. 25-*shows* a further optional power source, comprising an arrangement of pedals or cranks 107, driving the ground engagement means 16 via a drive train 115, enabling manual labour to be employed.

FIG. 26A drive train is situated within the leg assembly 4, sealed from contact with water. The leg 60 is shown cut-away to expose the internal drive train. In practice the leg 60 fully encloses the drive train and protects it from the water. Furthermore, the leg 60 has a hydrodynamically efficient cross section. The drive train comprises at least chains (not shown) and sprockets 110, however a number of other methods could be used, for example but not limited to, belts and pulleys, drive shafts and bevel gear boxes, etc.

1.7 Braking System

Figure 27:
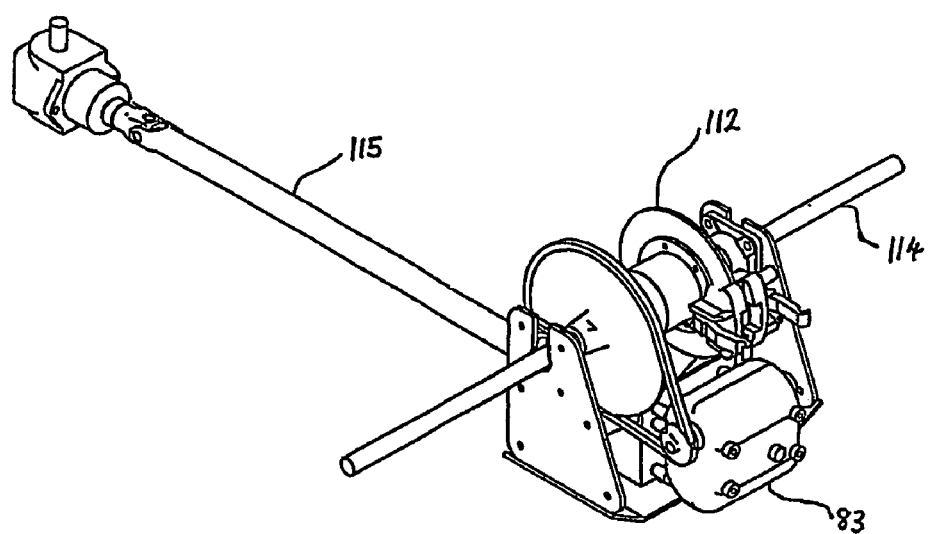

FIG. 27 shows a braking system employing a disk brake assembly 112 on a transverse drive shaft 114 which is used to provide motive power to the driven wheels. An advantage of this location for the brake assemblies is that it keeps the braking mechanisms substantially dry. As further examples, alternative locations for the brake assembly or assemblies 112, would be directly adjacent to each braked ground engagement means, or adjacent to the top of the leg supporting each braked ground engagement means.

The option of situating the brake assemblies 112 adjacent to the ground engagement means is advantageous if it is necessary to gain road worthiness acceptance for the vehicle.

Two further options are available to protect the brakes during operations into water, one being to house the brakes in a sealed and dry enclosure, the other being to employ sealed, wet brake assemblies (not shown).

To assist with or to provide steering, differential braking between ground engagement means on separate sides of the craft is used.

Also shown in this figure is an example of a reduction gearbox assembly 83, as referred to in earlier figures, and a drive shaft 115 transferring torque from a motor.

2.0 SECOND EXAMPLE

Jet Boat 2.1 Nose gear—similar to that described in Example 1 above, refer to paragraph 1.1.

2.2 Steering—similar to that described in Example 1 above, refer to paragraph 1.2

2.3 Aft gear—similar to that described in Example 1 above, refer to paragraph 1.3, except that shorter legs may be used since no external propeller requires protection during ground operations.

2.4 Stowage of legs and wheels—substantially within the existing lines of the craft as with the inflatable craft described in Example 1 above, except that the cowlings 5 & 6 will match the contours of the rigid hull 2.5 Motive power—similar to that described in Example 1 above, refer to paragraph 1.5. It is preferable in this case to utilise the existing marine engine 85, including the adaptations required for cooling and sound muffling.

2.6 Drive train—similar to that described in Example 1 above, refer to paragraph 1.6.

2.7 Braling—similar to that described in Example 1 above, refer to paragraph 1.7.

3.0 THIRD EXAMPLE

Outboard Powered Rigid Hull Craft 3.1 Nose gear—similar to that described in Example 1 above, refer to paragraph 1.1.

3.2 Steering—similar to that described in Example 1 above, refer to paragraph 1.2.

3.3 Aft gear—similar to that described in Example 1 above, refer to paragraph 1.3.

3.4 Stowage of legs and wheels—similar to that described in Example 2 above, refer to paragraph 2.4.

3.5 Motive power—similar to that described in Example 1 above, refer to paragraph 1.5.

3.6 Drive train—similar to that described in Example 1 above, refer to paragraph 1.6.

3.7 Braking—similar to that described in Example 1 above, refer to paragraph 1.7.

4.0 FOURTH EXAMPLE

Craft Powered by a Modified Outboard Motor 4.1 Nose gear—similar to that described in Example 1 above, refer to paragraph 1.1.

4.2 Steering—similar to that described in Example 1 above, refer to paragraph 1.2

4.3 Aft gear—similar to that described in Example 1 above, refer to paragraph 1.3

4.4 Stowage of legs and wheels—similar to that described in Example 1 or 2 above, refer to paragraph 1.1 and 2.1, depending whether the craft has an inflatable or rigid hull.

4.5 Motive power—uses a modified version of the outboard motor providing a "Power Take-Off" in the form of either a drive shaft, hydraulic pump, higher output electrical generator.

4.6 Drive train—similar to that described in Example 1 above, refer to paragraph 1.6, except for the additional option of a flexible driveshaft from motor introducing torque to the drive train.

4.7 Braking—similar to that described in Example 1 above, refer to paragraph 1.7.

5.0 FIFTH EXAMPLE

Propeller Craft Powered by Inboard Engine

This example relates to boats powered by an inboard engine, typically driving a propeller via a long shaft or via a stem drive unit.

5.1 Nose gear—similar to that described in Example 1 above, refer to paragraph 1.1.

5.2 Steering—similar to that described in Example 1 above, refer to paragraph 1.2

5.3 Mt gear—similar to that described in Example 1 above, refer to paragraph 1.3

5.4 Stowage of legs and wheels—similar to that described in Example 2 above, refer to paragraph 2.4.

5.5 Motive power—similar to that described in Example 2 above, refer to paragraph 2.5.

5.6 Drive train—similar to that described in Example 1 above, refer to paragraph 1.6

5.7 Braking—similar to that described in Example 1 above, refer to paragraph 1.7

Finally, it will be appreciated that various other alterations or modifications may be made to the foregoing without departing from the scope of this invention.

Advantages of the Preferred Embodiments

The preferred embodiment comprising an inflatable craft provides an amphibious vehicle in which appearance and function are maintained, and in which there is little loss of "living space" within the vehicle, and yet the advantages of the amphibian characteristics are achieved.

The preferred embodiment produces an amphibious vehicle with a broad range of utility on land, in that it is self propelled, steerable and has tyres suited to a variety of shoreline terrain, and yet the vehicle is not severely degraded in its performance as a boat.

Since the path of the legs during the extension and retraction cycles is essentially exterior to the craft, there are minimal disturbances to the hydrodynamic characteristics of the craft. The elimination of flaps and doors, and many other mechanisms exposed to water and water flow means that the craft will experience no great increase in problems from entrapment of seaweed or sand or other debri.

The simple coupling of the steerable wheel to the steering mechanism via a sealed engagement means further reduces the quantity of mechanisms exposed to the water. Similarly the action of the internal actuator, housed within the hull, to retract and extend the nose leg, helps to keep the maintenance burden light.

Variations

Although the amphibious vehicle has been described having balloon tyres, other less flexible tyres may be used and the legs provided with shock absorbing means.

Similarly, as a variation to wheels, continuous tracks can be used.

Steering has been described using a pivoting wheels, but an alternative would be to use differential braking, having a free pivoting front wheel for example.

What is claimed is:

1. A self propelled and steerable amphibious vehicle comprising:

at least one hull, a bow, a stern, and at least three leg assemblies, each of said leg assemblies having at least one substantially rigid elongate member, at least one hydraulically, electrically or pneumatically powerable actuator, and at least one ground engagement means, said elongate member of each of said leg assemblies being pivotally connected at or adjacent a first end to said at least one hull and having at least one ground engagement means connected thereto at or adjacent a second end, and said actuator of each of said leg assemblies being connected to its associated said elongate member, and each said actuator also being connected to said at least one hull, wherein at least two of said leg assemblies and their respective said actuators are connected to the stern and are arranged and adapted to support their respective said ground engagement means in a retracted position to the stern of the vehicle outside of a primary structure of said hull and above a waterline of the vehicle, and said at least two stern-mounted leg assemblies are able to move their respective said ground engagement means to an extended position where said ground engagement means supports the vehicle on land, travel of said ground engagement means from the retracted to the extended position being through an arc which does not pass through any opening or openings in the primary structure of said hull, and wherein a further one of said leg assemblies and its associated actuator is connected to the bow and is configured such that said further leg assembly supports its respective ground engagement means in a retracted position to the bow of the vehicle outside of the primary structure of the hull and where at least a portion of said ground engagement means is situated above the waterline of the vehicle and below a top of the bow of the vehicle, such that said bow mounted ground engagement means acts as a bumper or fender to provide at least partial protection to the bow of the vehicle when the vehicle is operated on water, and said bow mounted leg assembly is arranged and adapted so that its said ground engagement means move down and rearwardly in a general direction towards the stern from the retracted position to an extended position, in an arc, without passing through any openings in any of the primary structure of the hull.

2. The vehicle as claimed in claim 1, wherein said ground engagement means of said stern mounted leg assemblies, when stowed in the retracted position, are positioned such that they act as bumpers or fenders to provide at least partial protection to the stern of the vehicle, when the vehicle is operated on water.

3. The vehicle as claimed in claim 2, wherein the vehicle further includes a motor that is one of an outboard motor, jet drive and stern drive unit and said ground engagement means of said stern mounted leg assemblies, when in the retracted positions, act as bumpers or fenders to protect said motor when the vehicle is operated on water.

4. The vehicle as claimed in claim 1, wherein said powerable actuators of each of said leg assemblies are adapted to lift the hull off the ground, when moving said ground engagement means from the retracted position to the extended positions when the vehicle is on the ground.

5. The vehicle as claimed in claim 1, wherein at least two of said leg assemblies each further includes a drive motor adapted to propel the vehicle on land.

6. The vehicle as claimed in claim 1, wherein said ground engagement means of said bow mounted leg assembly is steerable and said leg assembly further includes a steering actuator which is adapted to steer the steerable ground engagement means.

7. The vehicle as claimed in claim 1, wherein said actuator of each of said leg assemblies is a linear actuator.

8. The vehicle as claimed in claim 1, wherein the vehicle includes a water jet propulsion system.

9. The vehicle as claimed in claim 1, wherein the vehicle is powered by an engine which is adapted to provide power to propel the vehicle both on the water and on land.

10. The vehicle as claimed in claim 1, wherein said hull includes pontoons along each side of said hull extending from the stern to the bow and wherein said bow mounted leg assembly is at least partially situated between the lines of forward ends of said pontoons when said bow mounted leg assembly is in the retracted position.

11. The vehicle as claimed in claim 1, wherein at least one of said ground engagement means is a wheel.

12. The vehicle as claimed in claim 11, wherein the wheel is a balloon tire.

13. An amphibious vehicle comprising:

a hull having a bow and a stern; and three leg assemblies, each of said leg assemblies having an elongate member, a powered actuator, and a ground engagement device, said elongate member of each of said leg assemblies having a first end pivotally connected to said hull and a second end to which said ground engagement device is connected, said actuator of each of said leg assemblies being connected to its associated said elongate member and to said hull, wherein two of said leg assemblies are stern leg assemblies connected to the stern and that are arranged and adapted to move their respective said ground engagement device between a retracted position at the stern above a waterline of the vehicle and an extended position where said ground engagement device supports the vehicle on land, and wherein one of said leg assemblies is a bow leg assembly connected to the bow and that is arranged and adapted to move its respective said ground engagement device between a retracted position at the bow above the waterline and an extended position where said ground engagement device supports the vehicle on land, the retracted position of said bow leg assembly being defined as a position in which most of said ground engagement device is below a top of the bow and part of the ground engagement device extends forward of a forwardmost part of the bow outside of the hull to be a bumper at the bow.

14. The vehicle of claim 13, wherein said two leg assemblies move each respective said ground engagement device inside a respective cowling in the hull in the retracted position.

* * * * *